United States Patent
Tsuda

(10) Patent No.: US 12,202,936 B2
(45) Date of Patent: *Jan. 21, 2025

(54) METHOD FOR PRODUCING POLYCARBONATE

(71) Applicants: NATIONAL UNIVERSITY CORPORATION KOBE UNIVERSITY, Hyogo (JP); MITSUBISHI GAS CHEMICAL COMPANY, INC., Tokyo (JP)

(72) Inventor: Akihiko Tsuda, Hyogo (JP)

(73) Assignees: NATIONAL UNIVERSITY CORPORATION KOBE UNIVERSITY, Hyogo (JP); MITSUBISHI GAS CHEMICAL COMPANY, INC., Tokyo (JP)

( * ) Notice: Subject to any disclaimer, the term of this patent is extended or adjusted under 35 U.S.C. 154(b) by 670 days.

This patent is subject to a terminal disclaimer.

(21) Appl. No.: 17/292,194

(22) PCT Filed: Nov. 14, 2019

(86) PCT No.: PCT/JP2019/044686
§ 371 (c)(1),
(2) Date: May 7, 2021

(87) PCT Pub. No.: WO2020/100975
PCT Pub. Date: May 22, 2020

(65) Prior Publication Data
US 2021/0388159 A1    Dec. 16, 2021

(30) Foreign Application Priority Data
Nov. 15, 2018   (JP) .................................. 2018-214976

(51) Int. Cl.
*C08G 64/38*   (2006.01)
*C08G 64/02*   (2006.01)
(Continued)

(52) U.S. Cl.
CPC ......... *C08G 64/38* (2013.01); *C08G 64/0208* (2013.01); *C08G 64/06* (2013.01); *C08G 64/1608* (2013.01)

(58) Field of Classification Search
None
See application file for complete search history.

(56) References Cited

U.S. PATENT DOCUMENTS 4,346,210 A   8/1982   Alewelt et al.
4,405,423 A   9/1983   Freund
(Continued)

FOREIGN PATENT DOCUMENTS

JP   6-179743   6/1994
JP   7-10811    1/1995
(Continued)

OTHER PUBLICATIONS

Office Action issued Mar. 7, 2023 in Chinese Patent Application No. 201980074645.0, with English-language translation.
(Continued)

*Primary Examiner* — Randy P Gulakowski
*Assistant Examiner* — Ha S Nguyen
(74) *Attorney, Agent, or Firm* — Wenderoth, Lind & Ponack, L.L.P.

(57) ABSTRACT

The objective of the present invention is to provide a method for producing a polycarbonate safely and efficiently. A method for producing a polycarbonate is characterized in comprising the step of irradiating a light to a composition comprising a $C_{1-4}$ halogenated hydrocarbon, the specific diol compound and the specific base in the presence of oxygen.

7 Claims, 1 Drawing Sheet

(51) Int. Cl.

| | | |
|---|---|---|
| C08G 64/06 | (2006.01) | |
| C08G 64/16 | (2006.01) | |
| C08G 64/18 | (2006.01) | |
| C08G 64/22 | (2006.01) | |
| C08G 64/24 | (2006.01) | |

(56) References Cited

U.S. PATENT DOCUMENTS

| | | |
|---|---|---|
| 5,728,773 A | 3/1998 | Jing et al. |
| 5,929,169 A | 7/1999 | Jing et al. |
| 7,138,479 B2 | 11/2006 | Dhara et al. |
| 2006/0135662 A1 | 6/2006 | Mullen |
| 2007/0197826 A1 | 8/2007 | Braun et al. |
| 2011/0245527 A1 | 10/2011 | Ooms et al. |
| 2015/0285954 A1 | 10/2015 | Ishizuka et al. |
| 2016/0032046 A1 | 2/2016 | Shirota et al. |
| 2020/0079723 A1 | 3/2020 | Tsuda |
| 2020/0122114 A1 | 4/2020 | Tsuda |
| 2022/0002234 A1 | 1/2022 | Tsuda et al. |

FOREIGN PATENT DOCUMENTS

| | | | |
|---|---|---|---|
| JP | 8-89975 | 4/1996 | |
| JP | 10-77339 | 3/1998 | |
| JP | 10-291965 | 11/1998 | |
| JP | 11-152328 | 6/1999 | |
| JP | 2000-319230 | 11/2000 | |
| JP | 2001-129397 | 5/2001 | |
| JP | 2001-512515 | 8/2001 | |
| JP | 2003-220332 | 8/2003 | |
| JP | 2007-527841 | 10/2007 | |
| JP | 2013-181028 | 9/2013 | |
| JP | 2020-83882 | 6/2020 | |
| JP | 7041925 | 3/2022 | |
| SU | 1020006 | 5/1983 | |
| WO | WO-2012073970 A1 * | 6/2012 | ............. C08G 64/06 |
| WO | 2014/171367 | 10/2014 | |
| WO | 2015/156245 | 10/2015 | |
| WO | 2018/211952 | 11/2018 | |
| WO | 2018/211953 | 11/2018 | |
| WO | 2020/050368 | 3/2020 | |
| WO | 2020/100970 | 5/2020 | |
| WO | 2020/100971 | 5/2020 | |

OTHER PUBLICATIONS

Office Action issued Mar. 20, 2023 in Taiwanese Patent Application No. 108141365, with English-language translation.
Office Action issued May 9, 2023 in Japanese Patent Application No. 2020-556163, with English-language translation.
Office Action issued Feb. 11, 2022 in corresponding Russian Patent Application No. 2021116821, with English language translation.
Office Action dated Feb. 10, 2022 in Russian Patent Application No. 2021116822, with English language translation.
Written Opinion issued Sep. 6, 2022 in Singapore Application No. 11202104284V.
Office Action dated Sep. 6, 2023 in corresponding Singapore Patent Application No. 11202104285Q.
Notice of Reasons for Refusal issued Sep. 26, 2023 in related Japan Patent Application No. 2020-556165, with English language translation.
Office Action issued Oct. 9, 2023 in related Singapore Patent Application No. 11202104284V.
Extended European Search Report issued Nov. 30, 2021 in corresponding European Patent Application No. 19883691.8.
Extended European Search Report issued Dec. 9, 2021 in corresponding European Patent Application No. 19883406.1.
Kuwahara et al., "Photochemical Molecular Storage of $Cl_2$, HCl, and $COCl_2$: Synthesis of Organochlorine Compounds, Salts, Ureas, and Polycarbonate with Photodecomposed Chloroform", Organic Letters, 2012, vol. 14, No. 13, pp. 3376-3379.

Taiwanese Office Action dated Nov. 25, 2022 in Taiwanese Patent Application No. 108141360, with English translation.
Communication pursuant to Article 94(3) EPC issued Jul. 21, 2023 in corresponding European Patent Application No. 19883406.1.
Office Action issued Jun. 7, 2023 in Saudi Arabian Patent Application No. 521421868, with English language translation.
International Search Report issued Jan. 21, 2020 in International (PCT) Application No. PCT/JP2019/044686.
International Search Report issued Jan. 28, 2020 in International (PCT) Application No. PCT/JP2019/044690.
Ohkuma et al., "Detection of aromatic primary amines by a photochemical reaction with pyridine", The Journal of the Japan Society for Analytical Chemistry, 1975, vol. 24, pp. 385-387.
Tsurugi et al., Journal of the Society of Rubber Science and Technology, Japan, 1970, vol. 43, No. 5, pp. 337-346, with partial English translation.
Herbich et al., "Mechanisms of fluorescence quenching by hydrogen bonding in various aza aromatics", J. Photochem. Photobiol. A: Chem., 1994, vol. 80, pp. 157-160.
Hoggard et al., "Catalysis of the photodecomposition of carbon tetrachloride in ethanol by an Amberlite anion exchange resin", Journal of Catalysis, 2010, vol. 275, pp. 243-249.
Brooke et al., "A Photocatalyzed Synthesis of Dialkyl Carbonates from Phosgene Generated in situ", Current Catalysis, 2015, vol. 4, No. 1, pp. 12-19.
Office Action issued Jul. 17, 2022 in corresponding Singapore Application No. 11202104285Q.
Office Action issued Aug. 4, 2022 in corresponding Chinese Application No. 201980074609.4, with English translation.
Office Action issued Dec. 16, 2022 in corresponding Taiwanese Application No. 108141365, with English-language translation.
Office Action issued Jan. 9, 2023 in corresponding Chinese Patent Application No. 201980074609.4, with English-language translation.
Saudi Arabian Office Action issued Dec. 25, 2023 in corresponding Saudi Arabian Patent Application No. 521421871, with English translation.
International Search Report issued Jul. 17, 2018 in International (PCT) Application No. PCT/JP2018/017348.
Kuwahara et al., "Photo-recycling reactions of Halomethanes (1): Synthesis of Urea Derivatives from Chloroform and Primary Amines", Abstracts of the meeting of The Chemical Society of Japan, 92nd, 2012, p. 1251, 2 K2-14, with partial English translation.
Kuwahara et al., "Photo-recycling reactions of Halomethanes (2): Synthesis of Carbonate Derivatives from Chloroform and Phenol Derivatives", Abstracts of the meeting of The Chemical Society of Japan, 92nd, 2012, p. 1251, 2 K2-16, with partial English translation.
Extended European Search Report issued Nov. 12, 2020 in European Patent Application No. 18802405.3.
Singapore Search Report and Written Opinion issued Feb. 11, 2021 in Singaporean Patent Application No. 11201909670Y.
Search Report and Office Action issued Jun. 15, 2021 in Russian Patent Application No. 2019138715, with English translation.
Office Action issued Sep. 12, 2024 in Korean Patent Application No. 10-2021-7016988, with English-langauge translation.
Office Action issued Sep. 26, 2024 issued in Korean Patent Application No. 10-2021-7016978, with English-language translation.
International Search Report issued Jul. 10, 2018 in International Application No. PCT/JP2018/017349.
Office Action issued Jul. 7, 2021 in European Patent Application No. 18 801 749.5.
Extended European Search Report issued Nov. 19, 2020 in European Patent Application No. 18801749.5.
Schoorl; van der Berg, "RX-ID 6330183," Chemisches Zentralblatt, 1905, vol. 76, No. II, p. 1623.
International Search Report issued Nov. 10, 2020 in International Application No. PCT/JP2020/033284.
Office Action issued Apr. 20, 2023 in Chinese Patent Application No. 202080061004.4, with English-language translation.
Extended European Search Report issued Dec. 8, 2023 in European Patent Application No. 20859957.1.

(56) References Cited

OTHER PUBLICATIONS

Alippi, A. et al, "Ultrasound cavitation in sonochemistry: decomposition of carbon tetrachloride in aqueous solutions of potassium iodide", Ultrasonics, vol. 30, No. 3, 1992, pp. 148-151.
Office Action issued Jun. 3, 2024 in Taiwanese Patent Application No. 109130332, with English language translation.
Cheung, Michael H. et al., "Sonochemical Destruction of Chlorinated Hydrocarbons in Dilute Aqueous Solutions", Environmental Science & Technology. vol. 25, No. 8, 1991, pp. 1510-1512.
International Search Report issued Apr. 5, 2022 in International Application No. PCT/JP2022/002661, with English language translation.
C.W. Montgomery, et al., "The Photochemical Decomposition of Phosgene", Contribution From The Chemical Laboratory Of The University Of California, J. Am. Chem. Soc., 1934, vol. 56, pp. 1089-1092.
Office action issued Sep. 13, 2022 in Japanese Application No. 2022-542485, with English language translation.
Office action issued Nov. 29, 2022 in Japanese Application No. 2022-542485, with English language translation.

* cited by examiner

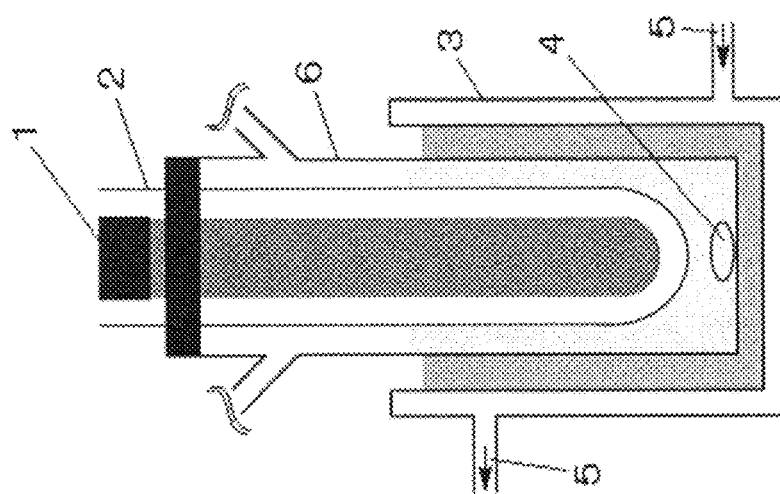

METHOD FOR PRODUCING POLYCARBONATE

TECHNICAL FIELD

The present invention relates to a method for producing a polycarbonate safely and efficiently.

BACKGROUND ART

A polycarbonate among a carbonate derivative is a condensate of carbonic acid and a bisphenol compound, and is widely used as an engineering plastic excellent in transparency and impact resistance.

A carbonate derivative is generally produced from phosgene and a nucleophilic functional group-containing compound. Phosgene is however very toxic. For example, phosgene is easily reacted with water to generate hydrogen chloride and has a history of being used as poisonous gas. Alternatively, a carbonate derivative is produced by reacting carbon monoxide, an alcohol and oxygen, but this method has a problem that toxic carbon monoxide must be used at high pressure. A method for safely producing a carbonate ester and a polycarbonate is therefore variously studied.

For example, Patent document 1 discloses a method for producing a target carbonate derivative by subjecting a carbonate ester to a transesterification reaction in the presence of a catalyst. This method however is not an essential solution, since the method has a problem of how to produce the carbonate derivative as a raw material compound. In addition, the method has a problem that an expensive catalyst must be used and a problem of a reverse reaction and a side reaction due to the remaining catalyst.

Patent document 2 discloses a method for producing a carbonate derivative from an epoxy compound and carbon dioxide in the presence of a catalyst. Phosgene and carbon monoxide are not needed to be used in this method but an expensive catalyst must be used and a high pressure carbon dioxide is needed. The method is therefore not suitable for an industrial mass production.

The inventor of the present invention has developed a method for producing a halogenated formate ester by subjecting a halogenated hydrocarbon and an alcohol to an oxidative photoreaction (Patent document 3) and a method for producing a polycarbonate by irradiating a light to chloroform in the presence of oxygen to obtain a mixture containing phosgene and reacting an alcohol with the mixture without isolating phosgene (Patent document 4).

PRIOR ART DOCUMENT

Patent Document

Patent document 1: JP H7-10811 A
Patent document 2: JP 2001-129397 A
Patent document 3: WO 2015/156245
Patent document 4: JP 2013-181028 A

Non-Patent Document

Non-patent document 1: OKUMA Seiichi et al., Japan analyst, Vol. 24, pp. 385-387 (1975)
Non-patent document 2: TSURUGI Jitsuo et al., Journal of the Society of Rubber Science and Technology, Japan, Vol. 43, No. 5, pp. 337-346 (1970)
Non-patent document 3: Jerzy Herbich et al., J. Photochem. Photobiol. A: Chem., 80, pp. 157-160 (1994)

DISCLOSURE OF THE INVENTION

Problems to be Solved by the Invention

Phosgene is generally used for producing a carbonate derivative as described above. Even if phosgene is not used in a certain production method, such a production method has problems that the other toxic compound and an expensive catalyst are used or phosgene must be used for producing a raw material compound.

Accordingly, the objective of the present invention is to provide a method for producing a polycarbonate safely and efficiently.

Means for Solving the Problems

The inventor of the present invention repeated intensive studies in order to solve the above-described problems. As a result, the inventor completed the present invention by finding that a polycarbonate can be amazingly produced in a safe and efficient manner by subjecting a hydrocarbon compound substituted with a halogeno group and the specific diol compound to a photoreaction in the presence of oxygen and the specific salt. In general, in a photoreaction, it is known that an organic salt forms a pigment, acts as an antioxidant to capture a radical and quenches a fluorescence through a mechanism such as an electron transfer, and that pyridine is decomposable into glutaraldehyde due to ultraviolet rays (Non-patent documents 1 to 3). In addition, it is predicted that an oxidative photodecomposition of a halogenated hydrocarbon is inhibited by an inorganic base aqueous solution, and even if a halogenated hydrocarbon is decomposed, it is known that a decomposed compound such as phosgene is immediately decomposed into carbon dioxide and a salt due to an inorganic base aqueous solution. An organic base and an inorganic base, therefore, may act against a photoreaction as inventions which were developed by the present inventor and which were described in Patent document 3 and Patent document 4. On the one hand, it was very amazing that a polycarbonate can be efficiently produced by a photoreaction in the presence of the specific base.

The present invention is hereinafter described.

[1] A method for producing a polycarbonate,
the method comprising the step of irradiating a light to a composition comprising a $C_{1-4}$ halogenated hydrocarbon, a diol compound and a base in the presence of oxygen,
wherein the base is one or more bases selected from the group substantially consisting of a heteroarylamine, a non-nucleophilic strong base and an inorganic base, and
wherein the diol compound is any one of the compounds represented by the following formulae ($I^1$) to ($I^6$):

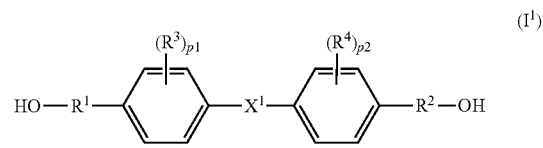

wherein $R^1$ and $R^2$ are independently —$(CR^5R^6)_{q1}$— or —$(—O—(CR^5R^6)_{q2}—)_{q3}$— wherein $R^5$ and $R^6$ are independently H or a $C_{1-6}$ alkyl group, q1 is an integer of 0 or more and 10 or less, q2 is an integer of 1 or more and 10 or less, q3 is an integer of 1 or more and 10 or less, and when q1 or q2 is an integer of 2 or more, a plurality of $R^5$ or $R^6$ may be the same as or different from each other, $R^3$ and $R^4$ are independently one or more halogeno groups selected from the group consisting of chloro, bromo and iodo, a $C_{1-20}$ aliphatic hydrocarbon group, a $C_{1-20}$ alkoxy group, a $C_{3-20}$ cycloalkyl group, a $C_{6-20}$ aromatic hydrocarbon group, a $C_{7-20}$ aralkyl group, a $C_{6-20}$ aromatic hydrocarbon oxy group or a $C_{3-20}$ cycloalkoxy group, $X^1$ is the following group:

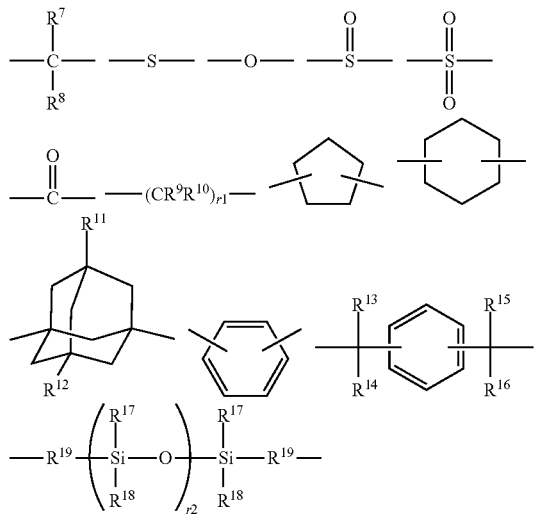

(wherein $R^7$ and $R^8$ are independently H, one or more halogeno groups selected from the group consisting of chloro, bromo and iodo, a $C_{1-20}$ aliphatic hydrocarbon group optionally having a substituent α, a $C_{1-20}$ alkoxy group optionally having a substituent α, a $C_{6-20}$ aromatic hydrocarbon group optionally having a substituent β, or $R^7$ and $R^8$ may bind together to form a $C_{3-20}$ carbon ring or a 5-12 membered hetero ring, $R^9$ and $R^{10}$ are independently H or a $C_{1-6}$ alkyl group, and when r1 is integer of 2 or more, a plurality of $R^9$ or $R^{10}$ may be the same as or different from each other, $R^{11}$ to $R^{18}$ are independently one or more halogeno groups selected from the group consisting of chloro, bromo and iodo, a $C_{1-20}$ aliphatic hydrocarbon group optionally having a substituent α, a $C_{1-20}$ alkoxy group optionally having a substituent α, or a $C_{6-12}$ aromatic hydrocarbon group optionally having a substituent $R^{19}$ is a $C_{1-9}$ alkylene group optionally having a substituent α, r1 is an integer of 1 or more and 20 or less, r2 is an integer of 1 or more and 500 or less.)

p1 and p2 are independently integers of 0 or more and 4 or less, substituent α is one or more substituents selected from a $C_{1-6}$ alkoxy group, a $C_{1-7}$ acyl group, one or more halogeno groups selected from the group consisting of chloro, bromo and iodo, an amino group, a nitro group, a cyano group and a carbamoyl group, substituent β is one or more substituents selected from a $C_{1-6}$ alkyl group, a $C_{1-6}$ alkoxy group, a $C_{1-7}$ acyl group, one or more halogeno groups selected from the group consisting of chloro, bromo and iodo. an amino group, a nitro group, a cyano group and a carbamoyl group,

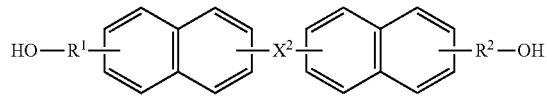

wherein $R^1$ and $R^2$ have the same meanings as the above, and $X^2$ has the same meaning as $X^1$, $$HO—R^1—X^3—R^2—OH \quad (I^3)$$

wherein $R^1$ and $R^2$ have the same meanings as the above, and $X^3$ is a $C_{15-32}$ divalent aromatic hydrocarbon group, $$HO—R^{20}—X^4—R^{21}—OH \quad (I^4)$$

wherein $R^{20}$ and $R^{21}$ are independently —$(CR^3R^6)_{m1}$— or —$(—O—(CR^5R^6)_{mb\,2}—)_{m3}$— (wherein $R^5$ and $R^6$ have the same meanings as the above, m1 is an integer of 1 or more and 10 or less, m2 is an integer of 1 or more and 10 or less, m3 is an integer of 1 or more and 10 or less, and when m1 or m2 is an integer of 2 or more, a plurality of $R^5$ or $R^6$ may be the same as or different from each other), and $X^4$ is a divalent group comprising one or more hydrocarbon rings or hetero ring, $$HO—R^1—X^5—R^2—OH \quad (I^5)$$

wherein $R^1$ and $R^2$ have the same meanings as the above, and $X^3$ is a divalent saturated heterocycle group,

wherein $X^6$ is a $C_{1-10}$ alkylene group, and n is an integer of 13 or more and 50 or less.

[2] The method according to the above [1], wherein the $C_{1-4}$ halogenated hydrocarbon is a $C_{1-4}$ polyhalogenated hydrocarbon.

[3] The method according to the above [1], wherein the $C_{1-4}$ halogenated hydrocarbon is chloroform.

[4] The method according to any one of the above [1] to [3], wherein the heteroarylamine is pyridine, picoline or lutidine.

[5] The method according to any one of the above [1] to [4], wherein the non-nucleophilic strong base is 1,5,7-triazabicyclo[4.4.0]deca-5-ene, 7-methyl-1,5,7-triazabicyclo[4.4.0]deca-5-ene, 1,8-diazabicyclo[5.4.0]undeca-7-ene or 1,5-diazabicyclo[4.3.0]non-5-ene or 1,1,3,3-tetramethylguanidine.

[6] The method according to any one of the above [1] to [5], wherein the inorganic base is an alkali metal hydroxide, an alkali metal hydrogencarbonate salt or an alkali metal carbonate salt.

[7] The method according to any one of the above [1] to [6], wherein 0.001 times or more by mole and 1 time or less by mole of the diol compound to the $C_{1-4}$ halogenated hydrocarbon is used.

[8] The method according to any one of the above [1] to [7], wherein 1.5 times or more by mole and 100 times or less by mole of the base to the diol compound is used.

[9] The method according to any one of the above [1] to [8], wherein the light irradiated to the composition comprises a light having a wavelength of 180 nm or more and 280 nm or less.

[10] The method according to any one of the above [1] to [9], wherein two or more kinds of the diol compound are used.

Effect of the Invention

It is not needed in the present invention method that an expensive catalyst and a highly toxic compound such as phosgene and carbon monoxide are used as a raw material compound. The present invention method is, therefore, industrially very useful as a technology to safely and efficiently produce a useful polycarbonate.

BRIEF DESCRIPTION OF THE DRAWINGS

FIG. 1 is a schematic diagram to demonstrate one example of the constitution of a reaction apparatus usable in the present invention method.

MODE FOR CARRYING OUT THE INVENTION

A light is irradiated to a composition comprising a $C_{1-4}$ halogenated hydrocarbon, a diol compound and a specific base in the presence of oxygen in the method for producing a polycarbonate according to the present invention.

1. $C_{1-4}$ Halogenated Hydrocarbon

The $C_{1-4}$ halogenated hydrocarbon may be decomposed due to the irradiated light and oxygen into a halogenated carbonyl or a halogenated carbonyl-like compound and reacted with the diol compound to generate a polycarbonate in the reaction of the present invention. Even if a toxic halogenated carbonyl is generated, the halogenated carbonyl is immediately reacted with the diol compound due to extremely high reactivity. As a result, the halogenated carbonyl is not leaked outside the reaction mixture, or even if the halogenated carbonyl is leaked, the leakage amount may be small. For example, phosgene as a halogenated carbonyl is very toxic and strict regulations are imposed on the transportation thereof; on the one hand, the $C_{1-4}$ halogenated hydrocarbon is certainly not so dangerous. Since the reaction of the present invention proceeds even in the presence of an inorganic base aqueous solution as described later, it may be possible that a halogenated carbonyl or a halogenated carbonyl-like compound does not intervene in the reaction of the present invention.

A $C_{1-4}$ halogenated hydrocarbon which is liquid under an atmospheric temperature and an atmospheric pressure is used as an organic solvent or the like in a large amount, but causes environmental pollution such as air pollution and ozone layer destruction when released to the atmosphere. The present invention is a technology to produce a useful compound by a photolysis of a $C_{1-4}$ halogenated hydrocarbon and greatly contributes to both an industry and an environmental science.

The $C_{1-4}$ halogenated hydrocarbon is an alkane, an alkene or an alkyne which have a carbon number of 1 or more and 4 or less and which is substituted by one or more halogeno groups selected from the group consisting of fluoro, chloro, bromo and iodo. As described above, the $C_{1-4}$ halogenated hydrocarbon may be decomposed by an irradiated light and oxygen and may act similarly to a halogenated carbonyl in the present invention. The $C_{1-4}$ halogenated hydrocarbon is preferably a $C_{1-2}$ halogenated hydrocarbon, and more preferably a halogenated methane. When the carbon number is 2 or more and 4 or less, the $C_{1-4}$ halogenated hydrocarbon is preferably an alkene or an alkyne having one or more unsaturated bonds in order to be decomposed more easily. In addition, it is preferred that the $C_{1-4}$ halogenated hydrocarbon has two or more of the above-described halogeno groups. Furthermore, a $C_{1-4}$ polyhalogenated hydrocarbon having two or more of the above-described halogeno groups on the same carbon is preferred, though there is a possibility that the above-described halogeno group is transferred upon the decomposition.

As the specific $C_{1-4}$ halogenated hydrocarbon, a $C_{1-4}$ halogenated alkane, a $C_{2-4}$ halogenated alkene or a $C_{2-4}$ halogenated alkyne is preferred, a halogenated methane, a halogenated ethene or a halogenated acetylene is more preferred, a polyhalogenated methane, a polyhalogenated ethene or a polyhalogenated acetylene having two or more of the above-described halogeno groups is particularly preferred, and a polyhalogenated methane is the most preferred, in terms of an easy generation of a halogenated carbonyl-like compound. An example of the $C_{1-4}$ halogenated hydrocarbon includes a fluoro methane such as trifluoro methane; a chloro methane such as dichloromethane, chloroform and carbon tetrachloride; a bromo methane such as dibromomethane and bromoform; an iodo methane such as iodomethane and diiodomethane; a halogenated methane such as chlorodifluoromethane, dichlorofluoromethane, trichlorofluoromethane and bromofluoromethane; a halogenated ethane such as 1,1,2-trichloroethane, 1,1,1-trichloroethane, 1,1,2,2-tetrachloroethane and 1,1,1,2-tetrachloroethane; a halogenated propane such as 1,1,1,3-tetrachloropropane; a perhalogenated alkane such as tetrachloromethane, tetrabromomethane, tetraiodomethane, hexachloroehane and hexabromoethane; and a perhalogenated ethene such as 1,1,2,2-tetrachloroethene and 1,1,2,2-tetrabromoethene.

The $C_{1-4}$ halogenated hydrocarbon may be appropriately selected depending on the target reaction and the desired product. One $C_{1-4}$ halogenated hydrocarbon may be used by itself, or two or more of the $C_{1-4}$ halogenated hydrocarbons may be used in combination. It is preferred that only one kind of the $C_{1-4}$ halogenated hydrocarbon is used depending on the target compound. The $C_{1-4}$ halogenated hydrocarbon having a chloro group is preferred.

The $C_{1-4}$ halogenated hydrocarbon usable in the present invention method may be a $C_{1-4}$ halogenated hydrocarbon which has been once used as, for example, a solvent. It is preferred that such a used $C_{1-4}$ halogenated hydrocarbon is purified to some extent for use, since if a large amount of an impurity and water are contained, the reaction may be possibly inhibited. For example, it is preferred that a water-soluble impurity is removed by washing with water and then the $C_{1-4}$ halogenated hydrocarbon is dried by anhydrous sodium sulfate, anhydrous magnesium sulfate or the like. An excessive purification that reduces productivity is not needed, since even when water is contained, the reaction may proceed. The water content is preferably 0 mass % or more, more preferably 0.0001 mass % or more, and more preferably 0.5 mass % or less, even more preferably 0.2 mass % or less, even more preferably 0.1 mass % or less. The $C_{1-4}$ halogenated hydrocarbon to be reused may contain a degradant of the $C_{1-4}$ halogenated hydrocarbon.

2. Diol Compound

The "diol compound" in this disclosure means a compound which has two nucleophilic hydroxy groups and which is represented by any one of the formulae ($I^1$) to ($I^6$). The diol compound is respectively abbreviated as the diol compound ($I^1$) to ($I^6$) in some cases. The diol compound used in the present invention does not have a fluoro as a substituent, and as a result, the polycarbonate produced by the present invention method also does not have a fluoro as a substituent. The reaction to obtain the polycarbonate can proceed by using the specific diol compound.

The diol compound ($I^1$) is represented by the following formula ($I^1$):

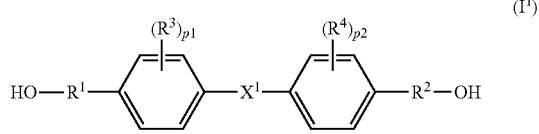

wherein $R^1$ and $R^2$ are independently —$(CR^5R^6)_{q1}$— or —$(-O-(CR^5R^6)_{q2}-)_{q3}$— wherein $R^5$ and $R^6$ are independently H or a $C_{1-6}$ alkyl group, q1 is an integer of 0 or more and 10 or less, q2 is an integer of 1 or more and 10 or less, q3 is an integer of 1 or more and 10 or less, and when q1 or q2 is an integer of 2 or more, a plurality of $R^5$ or $R^6$ are the same as or different from each other, $R^3$ and $R^4$ are independently a halogeno group selected from the group consisting of chloro, bromo and iodo, a $C_{1-20}$ aliphatic hydrocarbon group, a $C_{1-20}$ alkoxy group, a $C_{3-20}$ cycloalkyl group, a $C_{6-20}$ aromatic hydrocarbon group, a $C_{7-20}$ aralkyl group, a $C_{6-20}$ aromatic hydrocarbon oxy group or a $C_{3-20}$ cycloalkoxy group, $X^1$ is the following group:

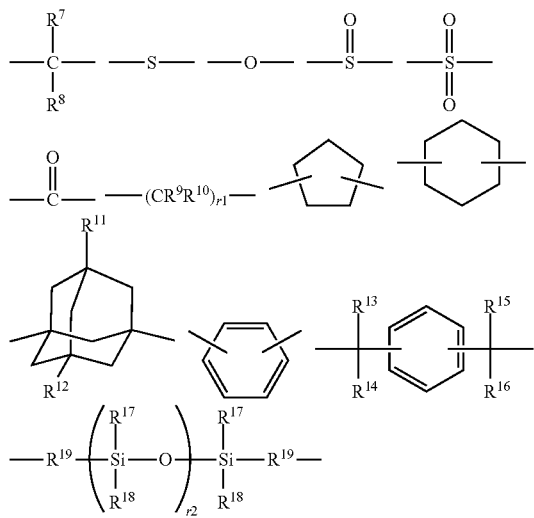

(wherein $R^7$ and $R^8$ are independently H, one or more halogeno groups selected from the group consisting of chloro, bromo and iodo, a $C_{1-20}$ aliphatic hydrocarbon group optionally having a substituent α, a $C_{1-20}$ alkoxy group optionally having a substituent α, a $C_{6-20}$ aromatic hydrocarbon group optionally having a substituent β, or $R^7$ and $R^8$ are connected to from a $C_{3-20}$ carbon ring or a 5-12 membered hetero ring, $R^9$ and $R^{18}$ are independently H or a $C_{1-6}$ alkyl group, and when r1 is an integer of 2 or more, a plurality of $R^9$ or $R^{10}$ are the same as or different from each other, $R^{11}$ to $R^{18}$ are independently one or more halogeno groups selected from the group consisting of chloro, bromo and iodo, a $C_{1-20}$ aliphatic hydrocarbon group optionally having a substituent α, a $C_{1-20}$ alkoxy group optionally having a substituent α or a $C_{6-12}$ aromatic hydrocarbon group optionally having a substituent β, $R^{19}$ is a $C_{1-9}$ alkylene group optionally having a substituent α, r1 is an integer of 1 or more and 20 or less, r2 is an integer of 1 or more and 500 or less.)

p1 and p2 are independently integers of 0 or more and 4 or less, the substituent α is one or more substituents selected from a $C_{1-6}$ alkoxy group, a $C_{1-7}$ acyl group, one or more kinds of halogeno groups selected from the group consisting of chloro, bromo and iodo, an amino group, a nitro group, a cyano group and a carbamoyl group, the substituent β is one or more substituents selected from a $C_{1-6}$ alkyl group, a $C_{1-6}$ alkoxy group, a $C_{1-7}$ acyl group, one or more kinds of halogeno groups selected from the group consisting of chloro, bromo and iodo, an amino group, a nitro group, a cyano group and a carbamoyl group.

An example of the —$(CR^5R^6)_{q1}$— includes an ethylene group, i.e. —$CH_2CH_2$—, and an example of the —O—$(CR^5R^6)_{q2}$— includes —O—$CH_2CH_2$— and —O—CH($CH_3$)$CH_2$—. When $R^1$ is —(—O— $(CR^5R^6)_{q2}-)_{q3}$, HO—$R^1$—Ph is not HO—(—O—$(CR^5R^6)_{q2}-)_{q3}$-Ph but is HO— (~ $(CR^5R^6)_{q2}$—O—$)_{q3}$-Ph in terms of stability. The q2 is preferably 2 or more.

The "halogeno group" is exemplified by chloro, bromo and iodo, and is preferably chloro or bromo and more preferably chloro.

The "$C_{1-20}$ aliphatic hydrocarbon group" is a linear or branched monovalent aliphatic hydrocarbon group having a carbon number of 1 or more and 20 or less, and exemplified by a $C_{1-20}$ alkyl group, a $C_{2-20}$ alkenyl group and a $C_{2-20}$ alkynyl group. An example of the $C_{1-20}$ alkyl group includes methyl, ethyl, n-propyl, isopropyl, n-butyl, isobutyl, s-butyl, t-butyl, n-pentyl, n-hexyl, n-octyl, n-decyl, n-pentadecyl and n-icosyl. The $C_{1-20}$ aliphatic hydrocarbon group is preferably a $C_{1-10}$ alkyl group or a $C_{1-6}$ alkyl group, more preferably a $C_{1-4}$ alkyl group or a $C_{1-2}$ alkyl group, and even more preferably methyl. An example of the $C_{2-20}$ alkenyl group includes ethenyl (vinyl), 1-propenyl, 2-propenyl (allyl), isopropenyl, 2-butenyl, 3-butenyl, isobutenyl, pentenyl, hexenyl, octenyl, decenyl, pentadecenyl and icosenyl. The $C_{2-20}$ alkenyl group is preferably a $C_{2-10}$ alkenyl group or a $C_{2-6}$ alkenyl group, and more preferably ethenyl (vinyl) or 2-propenyl (allyl). An example of the $C_{2-20}$ alkynyl group includes ethynyl, 1-propynyl, 2-propynyl, 2-butynyl, 3-butynyl, pentynyl, hexynyl, octynyl, decynyl, pentadecynyl and icosynyl. The $C_{2-20}$ alkynyl group is preferably a $C_{2-10}$ alkynyl group or a $C_{2-6}$ alkynyl group, and more preferably $C_{2-4}$ alkynyl group or a $C_{2-3}$ alkynyl group.

The "$C_{1-20}$ alkoxy group" is a linear or branched monovalent aliphatic hydrocarbon oxy group having a carbon number of 1 or more and 20 or less. The $C_{1-20}$ alkoxy group is exemplified by methoxy, ethoxy, n-propoxy, isopropoxy, n-butoxy, isobutoxy, t-butoxy, n-pentoxy and n-hexoxy, preferably a $C_{1-10}$ alkoxy group or a $C_{1-6}$ alkoxy group, more preferably a $C_{1-4}$ alkoxy group or a $C_{1-2}$ alkoxy group, and even more preferably methoxy.

The "$C_{3-20}$ cycloalkyl group" is a monovalent cyclic saturated aliphatic hydrocarbon group having a carbon number of 3 or more and 20 or less and exemplified by cycropropyl, cyclobutyl, cyclopentyl, cyclohexyl and adamantyl. The group is preferably a $C_{3-10}$ cycloalkyl group.

The "$C_{6-20}$ aromatic hydrocarbon group" is a monovalent aromatic hydrocarbon group having a carbon number of 6 or more and 20 or less, and exemplified by phenyl, indenyl, naphthyl, biphenyl, acenaphthenyl, fluorenyl, phenalenyl, phenanthrenyl, anthracenyl, triphenylenyl, pyrenyl, chrysenyl, naphthacenyl and perylenyl, and is preferably a $C_{6-12}$ aromatic hydrocarbon group and more preferably phenyl.

The "$C_{7-200}$ aralkyl group" is an alkyl group which is substituted by one aromatic hydrocarbon group and which has a carbon number of 7 or more and 20 or less and exemplified by benzyl, phenethyl, phenylpropyl, naphthylmethyl, naphthylethyl and biphenylmethyl, and is preferably benzyl.

The "$C_{6-20}$ aromatic hydrocarbon oxy group" is a monovalent aromatic hydrocarbon oxy group having a carbon number of 6 or more and 20 or less, and is exemplified by phenoxy, indenyloxy, naphthyloxy, biphenyloxy, acenaphthenyloxy, fluorenyloxy, phenalenyloxy, phenanthrenyloxy, anthracenyloxy, triphenylenyloxy, pyrenyloxy, chrysenyloxy, naphthacenyloxy and perylenyloxy, and is preferably $C_{6-12}$ aromatic hydrocarbon oxy group and more preferably phenoxy.

The "$C_{3-20}$ cycloalkoxy group" is a monovalent cyclic saturated aliphatic hydrocarbon oxy group having a carbon number of 3 or more and 20 or less, and is exemplified by cyclopropyloxy, cyclobutyloxy, cyclopentyloxy, cyclohexyloxy, adamantyloxy and cyclododecanyl, and preferably a $C_{3-12}$ cycloalkyloxy group.

An example of the substituent α includes a $C_{1-6}$ alkoxy group, a $C_{1-7}$ acyl group, one or more halogeno groups selected from the group consisting of chloro, bromo and iodo, an amino group, a nitro group, a cyano group and a carbamoyl group.

An example of the substituent β includes a $C_{1-6}$ alkyl group, a $C_{1-6}$ alkoxy group, a $C_{1-7}$ acyl group, one or more halogeno groups selected from the group consisting of chloro, bromo and iodo, an amino group, a nitro group, a cyano group and a carbamoyl group.

In the "amino group", a mono($C_{1-6}$ alkyl)amino group substituted by one $C_{1-6}$ alkyl group and a di ($C_{1-6}$ alkyl) amino group substituted by two $C_{1-6}$ alkyl groups are included in addition to a unsubstituted amino group (—$NH_2$). An example of the amino group includes amino (—$NH_2$); a mono($C_{1-6}$ alkyl)amino group such as methylamino, ethylamino, n-propylamino, isopropylamino, n-butylamino, isobutylamino, t-butylamino, n-pentylamino and n-hexylamino; and a di($C_{1-6}$ alkyl)amino group such as dimethylamino, diethylamino, di(n-propyl)amino, diisopropylamino, di(n-butyl)amino, diisobutylamino, di(n-pentyl) amino, di(n-hexyl)amino, ethylmethylamino, methyl(n-propyl)amino, n-butylmethylamino, ethyl(n-propyl)amino and n-butylethylamino, and is preferably a unsubstituted amino group.

The "$C_{1-7}$ acyl group" is a remaining atomic group which is obtained by removing OH from an aliphatic carboxylic acid and which has a carbon number of 1 or more and 7 or less, and is exemplified by formyl, acetyl, ethylcarbonyl, n-propylcarbonyl, isopropylcarbonyl, n-butylcarbonyl, isobutylcarbonyl, t-butylcarbonyl, n-pentylcarbonyl and n-hexylcarbonyl, and is preferably a $C_{1-4}$ acyl group and more preferably acetyl.

The substituent number of the substituent α is not particularly restricted as long as the substitution is possible and is exemplified by 1 or more and 20 or less. The substituent number is preferably 10 or less, preferably 5 or less or 3 or less and even more preferably 2 or less or 1.

The substituent number of the substituent β is not particularly restricted as long as the substitution is possible and is exemplified by 1 or more and 10 or less. The substituent number is preferably 5 or less, preferably 3 or less and even more preferably 2 or less or 1.

An example of the $C_{5-20}$ carbon ring formed by connecting $R^7$ and $R^8$ includes a $C_{3-20}$ cycloalkyl group optionally having a substituent β and a fused ring of a cycloalkyl group and an aromatic hydrocarbon group. An example of the fused ring includes acenaphthenyl and fluorenyl.

An example of the 5-12 membered hetero ring formed by connecting $R^7$ and $R^8$ includes oxiranyl, aziridinyl, tetrahydrofuranyl, tetrahydrothiophenyl, pyrrolidinyl, oxathiolanyl, piperidinyl and 1(3H)-isobenzofuranyl.

An example of the diol compound ($I^1$) specifically includes bis(4-hydroxyphenyl)methane, bis(2-hydroxyphenyl)methane, 2,4'-dihydroxydiphenylmethane, bis(4-hydroxyphenyl)ether, bis(4-hydroxyphenyl)sulfone, 2,4'-dihydroxydiphenylsulfone, bis(2-hydroxyphenyl)sulfone, bis(4-hydroxy-3-methylphenyl)sulfone, bis(4-hydroxyphenyl) sulfoxide, bis(4-hydroxyphenyl)sulfide, bis(4-hydroxyphenyl)ketone, 1,1-bis(4-hydroxyphenyl)ethane, 1,1-bis(4-hydroxyphenyl)-1-phenylethane, bis(4-hydroxyphenyl)diphenylmethane, 2,2-bis(4-hydroxyphenyl)propane, 2,2-bis(4-hydroxy-3-methylphenyl)propane, 1,1-bis (4-hydroxy-3-methylphenyl)ethane, bis(4-hydroxy-3-methylphenyl)methane, 2,2-bis(4-hydroxy-3-t-butylphenyl) propane, 2,2-bis(4-hydroxyphenyl)butane, 1,1-bis(4-hydroxyphenyl)cyclohexane, 1,1-bis(4-hydroxy-3-methylphenyl)cyclohexane, 1,1-bis(4-hydroxyphenyl) cycloundecane, 1,1-bis(4-hydroxyphenyl)cyclododecane, 2,2-bis(4-hydroxy-3-allylphenyl)propane, 3,3,5-trimethyl-1, 1-bis(4-hydroxyphenyl)cyclohexane, 9,9-bis(4-hydroxy-3-ethylphenyl)fluorene, 9,9-bis(4-hydroxy-3-methylphenyl) fluorene, 9,9-bis(4-hydroxyphenyl)fluorene, α,ω-bis[3-(o-hydroxyphenyl)propyl]polydimethyldiphenyl random copolymer siloxane, α,ω-bis[3-(o-hydroxyphenyl)propyl] polydimethylsiloxane, 4,4'-[1,4-phenylenebis(1-methylethylidene)]bisphenol, 4,4'-[1,3-phenylenebis(1-methylethylidene)]bisphenol, 2,2-bis(4-hydroxyphenyl)butane, 1,1-bis (4-hydroxyphenyl)-2-ethylhexane, 1,1-bis(4-hydroxyphenyl)-2-methylpropane, 2,2-bis(4-hydroxyphenyl)-4-methylpentane, 1,1-bis(4-hydroxyphenyl)decane, 1,3-bis(4-hydroxyphenyl)-5,7-dimethyladamantane, 9,9-bis[4-(2-hydroxyethoxy)phenyl] fluorene, 9,9-bis[4-(2-hydroxyethoxy)-3-methylphenyl] fluorene, 9,9-bis[4-(2-hydroxyethoxy)-3-t-butylphenyl] fluorene, 9,9-bis[4-(2-hydroxyethoxy)-3-isopropylphenyl] fluorene, 9,9-bis[4-(2-hydroxyethoxy)-3-cyclohexylphenyl] fluorene, 9,9-bis[4-(2-hydroxyethoxy)-3-phenylphenyl] fluorene, 4-(9-(4-hydroxyethoxy)phenyl)-9H-fluorene-9-yl) phenol, 2,2-bis(4-(2-hydroxyethoxy)phenyl)propane, 4,4-bis(2-hydroxyethoxy)biphenyl, 2,2'(9H-fluorene-9,9'-diyl) bis(ethane-1-ol), 9H-fluorene-9,9-diyl)dimethanol, 2,2'—(1, 4-phenylene)bis(ethane-1-ol), 2,2'—(1,4-phenylene)bis (methane-1-ol), 2,2'—(1,4phenylenebis(oxy))bis(ethane-1-ol), 1,1-bis(4-hydroxyphenyl)cyclododecane, 1,1-bis(4-hydroxy-3-methylphenyl)cyclododecane, 1,1-bis(4-hydroxy-3-phenylphenyl)cyclododecane, 1,1-bis(4-hydroxy-3-t-butylphenyl)cyclododecane, 1,1-bis(4-hydroxy-3-sec-butylphenyl)cyclododecane, 1,1-bis(4-hydroxy-3-allylphenyl)cyclododecane, 1,1-bis(4-hydroxy-3,5-dimethylphenyl)cyclododecane, 1,1-bis(4-hydroxy-3-fluorophenyl)cyclododecane, 1,1-bis(4-hydroxy-3-chlorophenyl)cyclododecane, 1,1-bis(4-hydroxy-3- bromophenyl)cyclododecane, 7-ethyl-1,1-bis(4-hydroxyphenyl)cyclododecane and 5,6-dimethyl-1,1-bis(4-hydroxyphenyl)cyclododecane.

Among the above examples, bis(4-hydroxyphenyl)methane, bis(2-hydroxyphenyl)methane, 2,4'-dihydroxydiphenylmethane, bis(4-hydroxyphenyl)ether, 2,2-bis(4-hydroxyphenyl)propane, 2,2-bis(4-hydroxy-3-methylphenyl)propane, 1,1-bis(4-hydroxyphenyl)cyclohexane, 9,9-bis[4-(2-hydroxyethoxy)phenyl]fluorene, 9,9-bis[4-(2-hydroxyethoxy)-3-phenylphenyl]fluorene, 1,1-bis(4-hydroxyphenyl)cyclododecane and 1,1-bis(4-hydroxy-3-methylphenyl)cyclododecane are particularly preferred. Further, the typical diol compound ($I^1$) is described as follows.

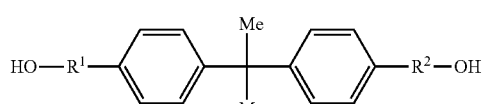
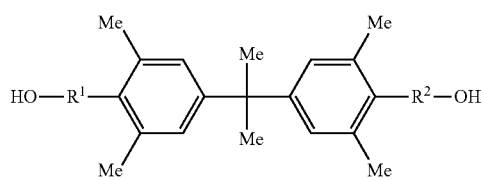
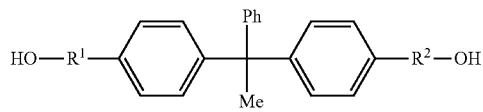
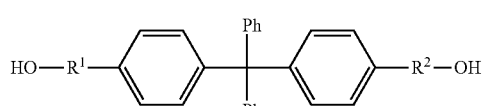
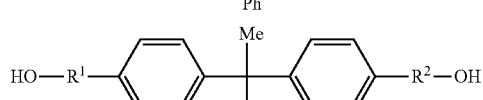
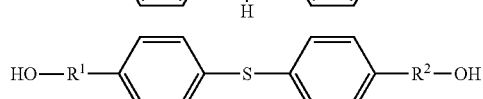
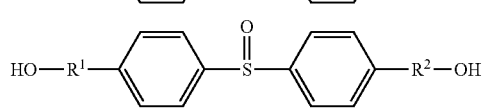
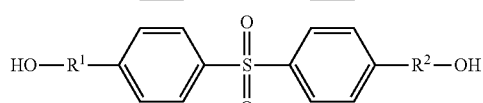
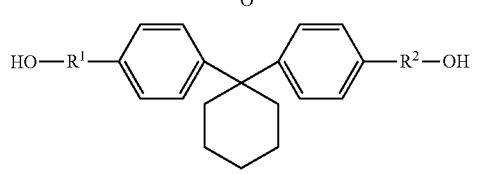
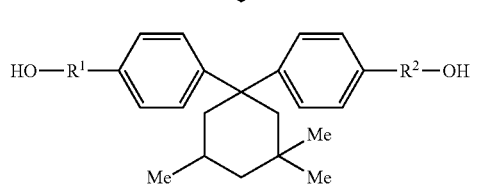

-continued
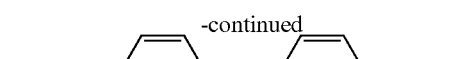
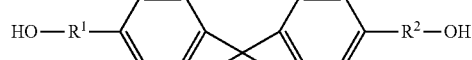

wherein $R^2$ and $R^2$ have the same meanings as the above.

Bisphenol A, Bisphenol AP, Bisphenol B, Bisphenol BP, Bisphenol E, Bisphenol F, Bisphenol TMC and Bisphenol Z may be excluded from the diol compound ($I^1$) in some cases.

The diol compound ($I^2$) is represented by the following formula ($I^2$):

wherein $R^1$ and $R^2$ have the same meanings as the above, and $X^2$ has the same meaning as $X^1$.

An example of the diol compound ($I^2$) specifically includes 9,9-bis[6-(1-hydroxymethoxy)naphthalene-2-yl]fluorene, 9,9-bis[6-(2-hydroxyethoxy)naphthalene-2-yl]fluorene, 9,9-bis[6-(3-hydroxypropoxy)naphthalene-2-yl]fluorene and 9,9-bis[6-(4-hydroxybutoxy)naphthalene-2-yl]fluorene. The diol compound ($I^2$) is particularly preferably 9,9-bis[6-(2-hydroxyethoxy)naphthalene-2-yl]fluorene.

The diol compound ($I^3$) is represented by the following formula ($I^3$).

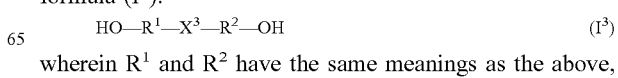

wherein $R^1$ and $R^2$ have the same meanings as the above, and $X^3$ is a $C_{15-32}$ divalent aromatic hydrocarbon group.

An example of the $C_{15-32}$ divalent aromatic hydrocarbon group includes a $C_{15-32}$ divalent fused polycyclic aromatic hydrocarbon group such as fluoranthrenylene, acephenanthrylenylene, aceanthrylenylene, triphenylene, pyrenylene, chrysenylene, naphthacenylene, pleiadenylene, picenylene, perylenylene, biphenylene, pentaphenylene, pentacenylene, tetraphenylenylene, hexaphenylene, hexacenylene, rubicenylene, coronenylene, trinaphthylenylene, heptaphenylene, heptacenylene, pyranthrenylene and ovalenylene; and terphenylene and quarterphenylene.

The number of $R^3$ group on $X^3$ is not particularly restricted as long as the substitution is possible and may be 1 or more and 10 or less, preferably 8 or less or 5 or less, and more preferably 1 or 2.

An example of the diol compound ($I^3$) specifically includes the binaphthalene diol compound represented by the following formula:

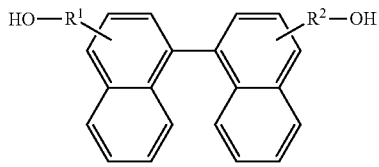

wherein $R^1$ and $R^2$ have the same meanings as the above.

An example of the binaphthalene diol compound includes 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene and 2,2'-bis(4-hydroxybutoxy)-1,1'-binaphthalene. In particular, 2,2'-bis(2-hydroxyethoxy)-1,1'-binaphthalene is preferred.

The diol compound ($I^4$) is represented by the following formula ($I^4$):

$$HO—R^{20}—X^4—R^{21}—OH \qquad (I^4)$$

wherein $R^{20}$ and $R^{21}$ are independently $—(CR^5R^6)_{m1}—$ or $—(—O—(CR^5R^6)_{m2}—)_{m3}—$ (wherein $R^5$ and $R^6$ have the same meanings as the above, m1 is an integer of 1 or more and 10 or less, m2 is an integer of 1 or more and 10 or less, m3 is an integer of 1 or more and 10 or less, and when m1 or m2 is an integer of 2 or more, a plurality of $R^5$ or $R^6$ are the same as or different from each other), $X^4$ is a divalent group comprising 1 or more hydrocarbon rings or hetero rings.

The m2 is preferably 2 or more.

An example of $—(CR^5R^6)_{m1}—$ includes ethylene group ($—CH_2CH_2—$), and an example of $—O—(CR^5R^6)_{m2}—$ includes $—O—CH_2CH_2—$ and $—O—CH(CH_3)CH_2—$. When $R^1$ is $—(—O—(CR^5R^6)_{m2}—)_{m3}$, HO—$R^1$—$X^3$— is not HO—$(—O—(CR^5R^6)_{m2}—)_{m3}$—$X^3$— but is HO—$(—(CR^5R^6)_{m2}—O—)_{m3}$—$X^3$— in terms of stability.

An example of the divalent group comprising 1 or more hydrocarbon rings or hetero rings includes a $C_{6-32}$ aromatic hydrocarbon group optionally having substituent β, a divalent $C_{3-20}$ cycloalkyl group optionally having substituent β, and a divalent group comprising one or more divalent $C_{6-32}$ aromatic hydrocarbon groups optionally having substituent β and divalent $C_{3-20}$ cycloalkyl groups optionally having substituent β.

The divalent $C_{6-32}$ aromatic hydrocarbon group may contain a hetero atom selected from an oxygen atom, a sulfur atom and a nitrogen atom as long as the group totally exhibits aromaticity. An example of the divalent $C_{6-32}$ aromatic hydrocarbon group includes the following groups but is not particularly restricted thereto.

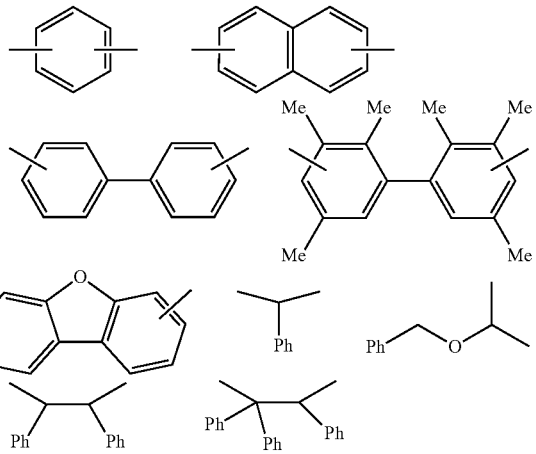

The divalent $C_{3-20}$ cycloalkyl group may also contain a hetero atom selected from an oxygen atom, a sulfur atom and a nitrogen atom. An example of the divalent $C_{3-20}$ cycloalkyl group includes the following groups but is not particularly restricted thereto.

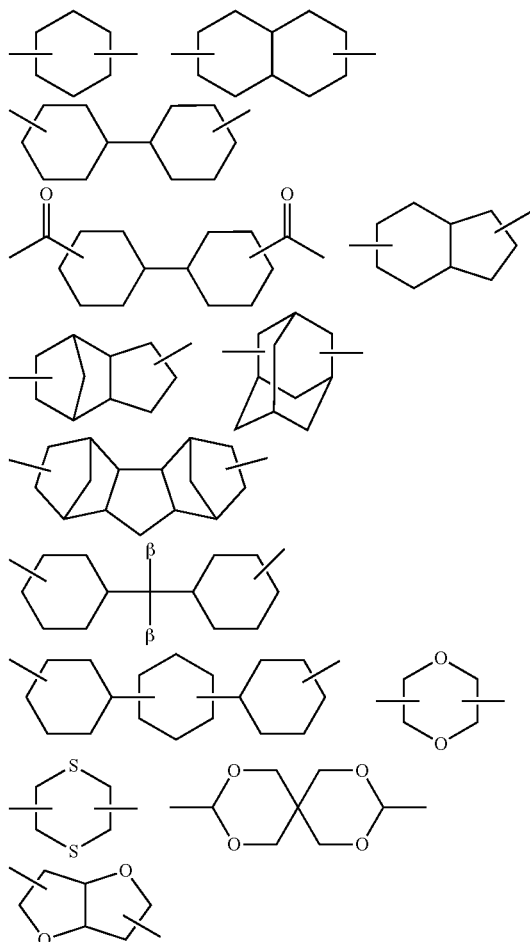

The divalent group comprising one or more divalent $C_{6-32}$ aromatic hydrocarbon groups optionally having substituent β and divalent $C_{3-20}$ cycloalkyl groups optionally having substituent β is exemplified by the following groups but is not particularly restricted thereto.

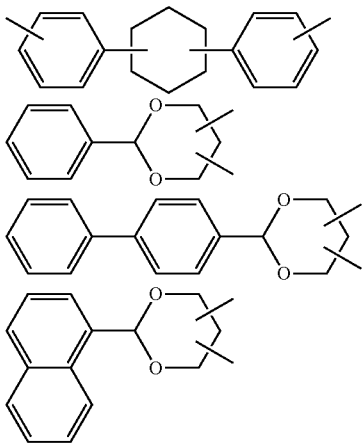

The diol compound ($I^5$) is represented by the following formula ($I^5$):

$$HO—R^1—X^5—R^2—OH \qquad (I^5)$$

wherein $R^1$ and $R^2$ have the same meanings as the above, and $X^5$ is a divalent saturated hetero ring group.

The divalent saturated hetero ring group is exemplified by the following groups and is not particularly restricted thereto.

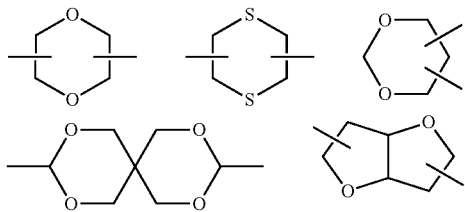

The diol compound ($I^6$) is represented by the following formula ($I^6$):

wherein $X^6$ is a $C_{1-10}$ alkylene group and n is an integer of 13 or more and 50 or less.

The $C_{1-10}$ alkylene group is a linear or branched divalent saturated aliphatic hydrocarbon group having a carbon number of 1 or more and 10 or less and is exemplified by —$CH_2$—, —$CH_2CH_2$—, —$CH_2CH_2CH_2$—, —$CH_2CH(CH_3)$—, —$CH(CH_3)CH_2$— and —$CH_2CH_2CH_2CH_2$—. The $X^6$ in the diol compound ($I^6$) may be the same as or different from each other. When there are two or more $X^5$, an arrangement of —O—$X^6$— may be in the form of random or block. The $C_{1-10}$ alkylene group is preferably a $C_{2-10}$ alkylene group.

One kind of the diol compound may be used by itself, or two or more kinds of the diol compounds may be used in combination. For example, when two kinds of the diol compounds are used in combination, a polycarbonate copolymer can be successfully produced. It is however preferred to use only one kind of the diol compound by itself in terms of a production efficiency or the like. When two kinds of the diol compounds are used, the number of the diol compound is preferably 5 or less, more preferably 3 or less, and even more preferably 2. When two kinds of the diol compounds are used to be copolymerized by the present invention method, a range of a physical property of the obtained polycarbonate can be enlarged and the physical property can be easily adjusted.

A usage amounts of the $C_{1-4}$ halogenated hydrocarbon and the diol compound are not particularly restricted as long as the reaction proceeds and the target compound can be obtained, and for example, even when 1 time by mole of the diol compound is used to the molar number of the $C_{1-4}$ halogenated hydrocarbon, the reaction proceeds. A molar ratio of the diol compound to the $C_{1-4}$ halogenated hydrocarbon, i.e. [diol compound]/[$C_{1-4}$ halogenated hydrocarbon], is preferably adjusted to 0.001 or more and 1 or less in terms of a reaction efficiency and a reaction time. The molar ratio is more preferably 0.01 or more, even more preferably 0.1 or more, and more preferably 0.8 or less, even more preferably 0.5 or less. When the molar ratio is excessively large, an amount of the nucleophilic functional group-containing compound relatively becomes larger and the unreacted nucleophilic functional group-containing compound is increased. On the one hand, when the molar ratio is excessively small, the unreacted $C_{1-4}$ halogenated hydrocarbon is increased and a halogenated carbonyl may be possibly leaked out of the reaction system. When the $C_{1-4}$ halogenated hydrocarbon is liquid under an atmospheric temperature and an atmospheric temperature pressure and can be also used as a solvent, a ratio of the diol compound to the $C_{1-4}$ halogenated hydrocarbon may be adjusted to 1 mg/mL or more and 500 mg/mL or less.

3. Base

One or more bases selected from the group substantively consisting of a heteroarylamine, a non-nucleophilic strong base and an inorganic base are used in the present invention method. The reaction to generate the polycarbonate may proceed by the base.

The heteroarylamine means a compound which has at least one hetero ring and which has at least one amine functional group. An example of the heteroarylamine includes pyridine and a derivative thereof, such as pyridine, α-picoline, β-picoline, γ-picoline, 2,3-lutidine, 2,4-lutidine, 2,6-lutidine, 3,5-lutidine, 2-chloropyridine, 3-chloropyridine and 4-chloropyridine.

The "non-nucleophilic strong base" means a strong base of which nucleophilicity of the lone electron pair on the nitrogen atom is weak due to steric hindrance. For example, a non-nucleophilic strong base of which basicity ($pK_{BH+}$) in acetonitrile is 20 or more may be used as the non-nucleophilic strong base. An example of the non-nucleophilic strong base includes 1,5,7-triazabicyclo[4.4.0]dec-5-ene (TBD, $pK_{BH+}$: 25.98), 7-methyl-1,5,7-triazabicyclo[4.4.0]dec-5-ene (MTBD, $pK_{BH+}$: 25.44), 1,8-diazabicyclo[5.4.0]undec-7-ene (DBU, $pK_{BH+}$: 24.33), 1,5-diazabicyclo[4.3.0]non-5-ene (DBN, $pK_{BH+}$: 23.89) and 1,1,3,3-tetramethylguanidine (TMG, $pK_{BH+}$: 23.30).

An example of the inorganic base includes an alkali metal hydroxide such as lithium hydroxide, sodium hydroxide and potassium hydroxide; an alkaline earth metal hydroxide such as calcium hydroxide; magnesium hydroxide; an alkali metal carbonate such as sodium carbonate and potassium carbonate; an alkaline earth metal carbonate such as calcium carbonate; magnesium carbonate; and an alkali metal hydrogen carbonate such as sodium hydrogen carbonate.

The inorganic base may be pulverized just before use to be added to the reaction mixture but an aqueous solution thereof is preferably added. A concentration of such an inorganic base aqueous solution may be appropriately adjusted and for example, may be adjusted to 0.05 g/mL or more and 2 g/mL or less. An inorganic base aqueous solution is used for decomposing phosgene. Specifically, phosgene is decomposed into carbon dioxide and hydrogen chloride in the presence of water and the hydrogen chloride can be neutralized by an inorganic base. It was therefore amazing that the present invention reaction proceeds even when the inorganic base aqueous solution is used as Examples described later, since the present inventor considers that the present invention reaction proceeds via formation of phosgene. In addition, there is a possibility that the present invention reaction proceeds without formation of phosgene, since the present invention reaction proceeds even in the case where the inorganic base aqueous solution is used.

One kind of the above base may be used by itself, or two or more kinds of the above bases may be used in combination.

A usage amount of the base may be appropriately adjusted as long as the reaction successfully proceeds, and for example, the usage amount to the diol compound may be adjusted to 1.5 times or more by mole and 100 times or less by mole. In general, when the usage amount of the base is larger, the yield becomes larger; therefore, the above ratio is preferably 2.0 times or more by mole, more preferably 3.0 times or more by mole, and even more preferably 4.0 times or more by mole.

In addition, a compound having a catalytic activity may be added to the reaction mixture. An example of such a catalytic compound includes an organic salt, an inorganic salt, an oxide, a hydride and an alkoxide of an alkali metal and an alkaline earth metal; and a quaternary ammonium salt. One kind of the catalytic compound may be used by itself, or two or more kinds of the catalytic compounds may be used in combination.

An example of the organic salt of an alkali metal includes sodium acetate, potassium acetate, cesium acetate, lithium acetate, sodium stearate, potassium stearate, cesium stearate, lithium stearate, sodium benzoate, potassium benzoate, cesium benzoate, lithium benzoate, disodium salt, dipotassium salt, dicesium salt and dilithium salt of Bisphenol A, sodium salt, potassium salt, cesium salt and lithium salt of phenol, and disodium phenyl phosphate. As the inorganic salt of an alkali metal, for example, disodium hydrogenphosphate, dipotassium hydrogenphosphate and dilithium hydrogenphosphate are used.

An example of the organic salt of an alkaline earth metal includes calcium acetate, strontium acetate, barium acetate, calcium stearate, calcium benzoate and magnesium phenyl phosphate.

An example of the quaternary ammonium salt includes a quaternary ammonium hydroxide having an alkyl group and/or an aryl group, such as tetramethylammonium hydroxide, tetraethylammonium hydroxide, tetrapropylammonium hydroxide, tetrabutylammonium hydroxide and benzyltrimethylammonium hydroxide; and an imidazole derivative such as 2-methylidazole, 2-phenylidazole and benzimidazole.

4. Reaction Condition

The present invention method comprises a step of irradiating a light to a composition comprising the $C_{1-4}$ halogenated hydrocarbon, the diol compound and the base in the presence of oxygen.

A manner to mix the $C_{1-4}$ halogenated hydrocarbon, the diol compound and the base is not particularly restricted. For example, total amount of each compound may be preliminarily mixed in a reaction vessel, or the compounds may be added in several portions or continuously added at any speed. When one or both of the $C_{1-4}$ halogenated hydrocarbon and the diol compound are not liquid in an atmospheric temperature and an atmospheric pressure, a solvent which can appropriately dissolve the raw material compounds and which does not inhibit the present invention reaction may be used. An example of such a solvent includes an aliphatic hydrocarbon solvent such as n-hexane; an aromatic hydrocarbon solvent such as benzene, toluene, xylene and chlorobenzene; an ether solvent such as diethyl ether, tetrahydrofuran and dioxane; and a nitrile solvent such as acetonitrile.

An oxygen source may be a gas containing oxygen, and for example, air or purified oxygen may be used. Purified oxygen may be mixed with an inert gas such as nitrogen and argon to be used. It is preferred to use air in terms of cost and easiness. An oxygen content in the gas used as an oxygen source is preferably about 15 vol % or more and about 100 vol % or less in terms of high decomposition efficiency of the $C_{1-4}$ halogenated hydrocarbon by light irradiation. The oxygen content may be appropriately determined depending on the kind of the $C_{1-4}$ halogenated hydrocarbon or the like. For example, when a $C_{1-4}$ chlorohydrocarbon compound such as dichloromethane, chloroform and tetrachloroethylene is used as the $C_{1-4}$ halogenated hydrocarbon, the oxygen content is preferably 15 vol % or more and 100 vol % or less. When a $C_{1-4}$ bromohydrocarbon compound such as dibromomethane and bromoform is used, the oxygen content is preferably 90 vol % or more and 100 vol % or less. Even when oxygen having an oxygen content of 100 vol % is used, the oxygen content can be controlled in the above-described range by adjusting a flow rate of oxygen into the reaction system. A manner to supply a gas containing oxygen is not particularly restricted, and the gas may be supplied into the reaction system from an oxygen tank equipped with a flow rate adjustor or from an oxygen generating device.

The phrase "in the presence of oxygen" means any one of the state that the above-described each compound is contacted with oxygen and the state that there is oxygen in the above-described composition. The reaction of the present invention may be carried out under a stream of a gas containing oxygen but it is preferred to supply a gas containing oxygen into the composition by bubbling in terms of a high yield of the product.

An amount of oxygen-containing gas may be appropriately determined depending on the amount of the $C_{1-4}$ halogenated hydrocarbon or a shape of a reaction vessel. For example, an amount of the gas supplied to a reaction vessel per 1 minute to the $C_{1-4}$ halogenated hydrocarbon in the reaction vessel is preferably 5 times or more by volume. The ratio is more preferably 25 times or more by volume, and even more preferably 50 times or more by volume. The upper limit of the ratio is not particularly restricted, and the ratio is preferably 500 times or less by volume, more preferably 250 times or less by volume, and even more preferably 150 times or less by volume. The amount of oxygen supplied to a reaction vessel per 1 minute to the $C_{1-4}$ hydrocarbon compound in the reaction vessel may be 5 times or more by volume and 25 times or less by volume. When an amount of the gas is excessively large, the $C_{1-4}$ hydrocarbon compound may be possibly volatilized, but when the amount is excessively small, it may possibly become difficult to proceed the reaction. For example, a supply rate of oxygen may be 0.01 L/min or more and 10 L/min or less per 4 mL of the $C_{1-4}$ halogenated hydrocarbon compound.

The light irradiated on the composition is preferably a light containing a short wavelength light, more preferably a light containing ultraviolet light, specifically preferably a light containing a light having a wavelength of 180 nm or more and 500 nm or less, and more preferably a light having a peak wavelength of 180 nm or more and 500 nm or less. A wavelength of the light may be appropriately determined depending on the kind of the $C_{1-4}$ halogenated hydrocarbon, and is more preferably 400 nm or less and even more preferably 300 nm or less. When the irradiated light contains a light of the above-described wavelength range, the $C_{1-4}$ halogenated hydrocarbon undergoes oxidative photodecomposition in an efficient fashion. For example, the light containing UV—B having a wavelength of 280 nm or more and 315 nm or less and/or UV—C having a wavelength of 180 nm or more and 280 nm or less or a light having a peak wavelength included in the ranges can be used, and the light containing UV—C having a wavelength of 180 nm or more and 280 nm or less or a light having a peak wavelength included in the range is preferably used.

A means for the light irradiation is not particularly restricted as long as the light having the above-described wavelength can be irradiated by the means. An example of a light source of the light having such a wavelength range includes sunlight, low pressure mercury lamp, medium pressure mercury lamp, high pressure mercury lamp, ultra-high pressure mercury lamp, chemical lamp, black light lamp, metal halide lamp and LED lamp. A low pressure mercury lamp is preferably used in terms of a reaction efficiency and a cost.

The condition such as a strength of the light to be irradiated, an irradiation time or the like may be appropriately determined depending on the kind and usage amount of the raw material compounds. For example, a light strength at a shortest distance position of the composition from the light source is preferably 1 mW/cm$^2$ or more and 50 mW/cm$^2$ or less. An irradiation time is preferably 0.5 hours or more and 10 hours or less, more preferably 1 hour or more and 6 hours or less, and even more preferably 2 hours or more and 4 hours or less. A manner to irradiate the light is not also particularly restricted, and any manners can be selected. For example, the light may be continuously irradiated from the reaction-initiation to the reaction-completion, irradiation and unirradiation of the light may be alternately repeated, and the light may be irradiated from the reaction initiation for a predetermined time only. When irradiation and unirradiation of the light may be alternately repeated, a further polymerization can be expected by alternately repeating a halogeno-carbonylation of the diol compound and a deprotonation from the hydroxy group due to the base. The present invention method, therefore, preferably comprises the step of stirring the composition without irradiating the light. A shortest distance between the light source and the $C_{1-4}$ halogenated hydrocarbon is preferably 1 m or less, more preferably 50 cm or less, and even more preferably 10 cm or less or 5 cm or less. The lower limit of the shortest distance is not particularly restricted and may be 0 cm, in other words, the light source may be immersed into the $C_{1-4}$ halogenated hydrocarbon.

A temperature during the reaction is not particularly restricted and may be appropriately adjusted, and for example, may be adjusted to 0° C. or higher and 50° C. or lower. The temperature is more preferably 10° C. or higher, even more preferably 20° C. or higher, and more preferably 40° C. or lower, even more preferably 30° C. or lower.

A reaction apparatus usable in the production method of the present invention is exemplified by a reaction vessel equipped with a light irradiation means. A reaction apparatus may be equipped with a stirring device and a temperature control means. One embodiment of a reaction apparatus usable in the production method of the present invention is shown in FIG. 1. The reaction apparatus shown in FIG. 1 has a light irradiation means 1 in a cylindrical reaction vessel 6. The above-described raw material compounds are added into a cylindrical reaction vessel 6, and a light is irradiated by using a light irradiation means 1 while a gas containing oxygen is supplied into the cylindrical reaction vessel 6 or a gas containing oxygen is blown into the composition to cause bubbling (not shown in the FIGURE) for the reaction. When a light irradiation means 1 is covered with a jacket 2 or the like, it is preferred that the jacket is composed of a material that allows passing the short wavelength light. A light may be irradiated from outside a reaction vessel. In such a case, the reaction vessel is composed of a material that allows passing the short wavelength light. A material that allows passing the short wavelength light is not particularly restricted as long as the effect of the present invention is not inhibited, and is preferably exemplified by quartz glass.

The product obtained by the reaction may be purified by a conventionally known method. An example of such a purification method includes distillation, removal of a raw material compound under reduced pressure, column chromatography, liquid separation, extraction, washing and recrystallization.

The following polycarbonates (II$^1$) to (II$^6$) can be safely and efficiently produced from the diol compounds (I$^1$) to (I$^6$) by the present invention method.

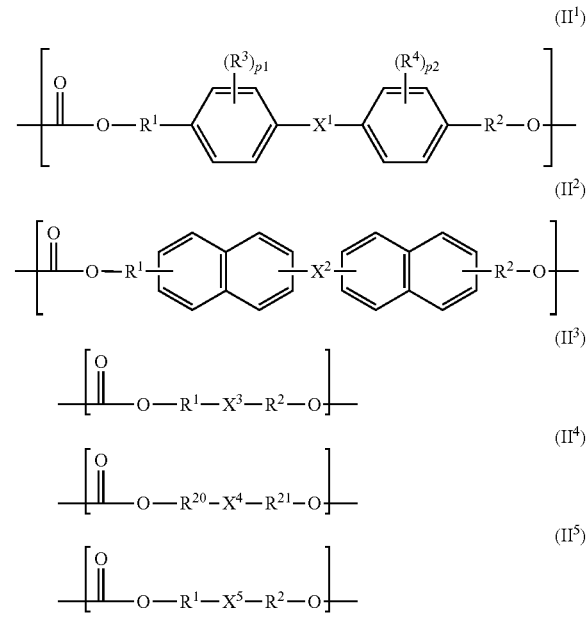

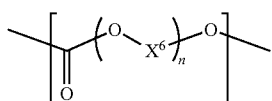

The above polycarbonates ($II^1$) to ($II^6$) have fewer branched structure produced at the heating process for the polymerization, and have higher quality than the polycarbonate obtained by a general melt polymerization.

The present application claims the benefit of the priority date of Japanese patent application No. 2018-214976 filed on Nov. 15, 2018. All of the contents of the Japanese patent application No. 2018-214976 filed on Nov. 15, 2018, are incorporated by reference herein.

EXAMPLES

Hereinafter, the examples are described to demonstrate the present invention more specifically, but the present invention is in no way restricted by the examples, and the examples can be appropriately modified to be carried out within a range which adapts to the contents of this specification. Such a modified example is also included in the range of the present invention.

Example 1: Production of BisP-CDE Polycarbonate

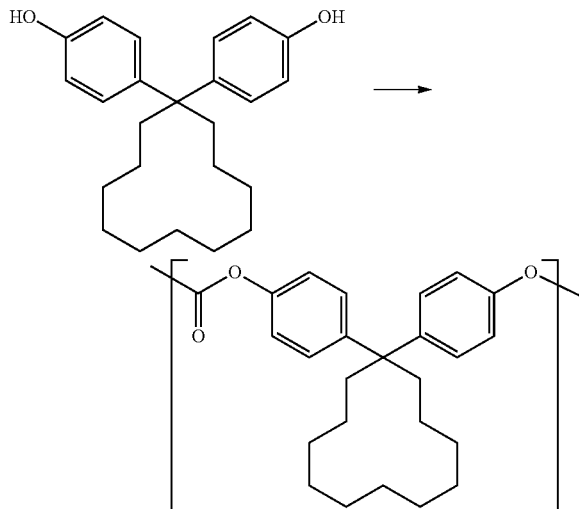

A quartz glass jacket having a diameter of 30 mm was inserted into a cylindrical reaction vessel having a diameter of 42 mm and a volume of 100 mL, and a low pressure mercury lamp ("UVL20PH-6" manufactured by SEN Light, 20 W, φ24×120 mm) was further inserted into the quartz glass jacket to construct a reaction system. A schematic picture of the reaction system is shown in FIG. 1. The light irradiated from the low pressure mercury lamp contained UV-C having a wavelength of 254 nm, and the illumination intensity of the light having a wavelength of 254 nm at the position 5 mm from the tube wall was 6.23 to 9.07 $mW/cm^2$. In the reaction vessel, purified chloroform (20 mL), 4,4'-cyclododecylidenebisphenol (BisP-CDE manufactured by Honshu Chemical Industry) (3.52 g, 10 mmol) and 5 times by mole of pyridine (4.04 mL) to BisP-CDE were added and mixed under stirring. Oxygen gas was blown into the stirred reaction mixture at a flow rate of 1 L/min at 20° C. to cause bubbling, and a light was irradiated from the low pressure mercury lamp for 2 hours.

Then, the power of the low pressure mercury lamp was turned off, and the reaction mixture was stirred at 50° C. for 1 hour with continuously blowing oxygen. Methanol (30 mL) was then added, and the precipitate was obtained by filtration. The obtained insoluble component was dissolved in chloroform, and the solution was washed with distilled water. The obtained chloroform solution was dried over anhydrous sodium sulfate and then concentrated. Methanol was added to the residue, and the re-precipitated component was obtained by filtration and dried at 50° C. under reduced pressure for 2 hours to obtain white powder (yield amount: 2.91 g, yield: 77%). The obtained solid was analyzed by $^1H$ NMR; as a result, it was confirmed that the target compound was produced.

The obtained BisP-CDE polycarbonate was analyzed by gel permeation chromatography (GPC) in the following conditions to measure the molecular weight. The result is shown in Table 1.

Apparatus: High speed GPC system ("HLC-8320GPC" manufactured by Tosoh Corporation)
Column: "SuperMultipoer HZ-M" (4.6 mm×150 mm, 3 columns in series, manufactured by Tosoh)
Moving phase: chloroform Flow rate: 0.35 mL/min
Oven temperature: 40° C. Concentration: 0.2 w/v %
Injection amount: 10 μL Standard of molecular weight: polystyrene
Detector: RI

TABLE 1

| Mw | Mn | Mw/Mn |
|---|---|---|
| 23,000 | 4,800 | 4.79 |

Example 2: Production of BisP-CDE Polycarbonate

Purified chloroform (20 mL), BisP-CDE (3.52 g, 10 mmol) and a sodium hydroxide aqueous solution (NaOH: 8 g, 50 mL, 200 mmol) were added into the reaction vessel of the reaction system used in Example 1, and the mixture was mixed under stirring. Oxygen gas was blown into the stirred reaction mixture at a flow rate of 1 L/min at 20° C. to cause bubbling, and a light was irradiated from the low pressure mercury lamp for 1 hour.

Dichloromethane was added to the reaction mixture, and the organic phase and the aqueous phase were separated. The organic phase was dried using anhydrous sodium sulfate and concentrated to obtain brown oil (yield amount: 5.87 g, yield: >100%). The obtained solid was analyzed by $^1H$ NMR; as a result, it was confirmed that the target compound containing dichloromethane was produced. The yield exceeded 100% due to the remained solvent.

The molecular weight of the obtained BisP-CDE polycarbonate was measured similarly to the conditions of Example 1. The result is shown in Table 2.

TABLE 2

| Mw | Mn | Mw/Mn |
|---|---|---|
| 13,500 | 7,100 | 1.89 |

Example 3: Synthesis of TCDDM Polycarbonate

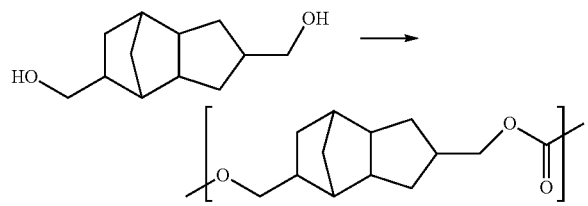

In the reaction vessel of the reaction system used in Example 1, purified chloroform (20 mL), tricyclo[5.2.1.0$^{2,6}$]decanedimethanol (TCDDM manufactured by Oxea) (1.96 g, 10 mmol) and 5 times by mole of pyridine (4.04 mL) to TCDDM were added and mixed under stirring. Oxygen gas was blown into the stirred reaction mixture at a flow rate of 1 L/min at 20° C. to cause bubbling, and a light was irradiated from the low pressure mercury lamp for 2 hours.

Then, the power of the low pressure mercury lamp was turned off, and the reaction mixture was stirred at 50° C. for 1 hour. Water and dichloromethane were added to the reaction mixture, and then the aqueous phase and the organic phase were separated. The organic phase was dried using anhydrous sodium sulfate and then concentrated. Methanol and chloroform were added to the residue, and the re-precipitated component was obtained by filtration and dried at 50° C. for 1 hour under reduced pressure to obtain brown powder (yield amount: 1.35 g, yield: 61%). The obtained solid was analyzed by $^1$H NMR; as a result, it was confirmed that the target compound was produced.

The molecular weight of the obtained TCDDM polycarbonate was measured by a similar conditions to Example 1. The result is shown in Table 3.

TABLE 3

| Mw | Mn | Mw/Mn |
|---|---|---|
| 17,100 | 2,700 | 6.32 |

Example 4: Synthesis of TCDDM Polycarbonate

In the reaction vessel of the reaction system used in Example 1, purified chloroform (20 mL), TCDDM (1.96 g, 10 mmol) and sodium hydroxide aqueous solution (NaOH: 8 g, 50 mL, 200 mmol) were added and mixed under stirring. Oxygen gas was blown into the stirred reaction mixture at a flow rate of 1 L/min at 0° C. to cause bubbling, and a light was irradiated from the low pressure mercury lamp for 1 hour.

Then, the power of the low pressure mercury lamp was turned off, and sodium hydroxide aqueous solution (NaOH: 8 g, 50 mL, 200 mmol) was further added. The mixture was stirred at 0° C. for 2 hours and further at atmospheric temperature for 18 hours.

Dichloromethane was added to the reaction mixture, and the aqueous phase and the organic phase were separated. The organic phase was dried using anhydrous sodium sulfate and then concentrated. Methanol was added to the residue, and the re-precipitated component was obtained by filtration and dried at atmospheric temperature for 2 hours under reduced pressure to obtain white powder (yield amount: 1.51 g, yield: 68%). The obtained solid was analyzed by $^1$H NMR; as a result, it was confirmed that the target compound was produced.

The molecular weight of the obtained TCDDM polycarbonate was measured by a similar conditions to Example 1. The result is shown in Table 4.

TABLE 4

| Mw | Mn | Mw/Mn |
|---|---|---|
| 2,300 | 1,200 | 1.95 |

Example 5: Synthesis of BPEF Polycarbonate

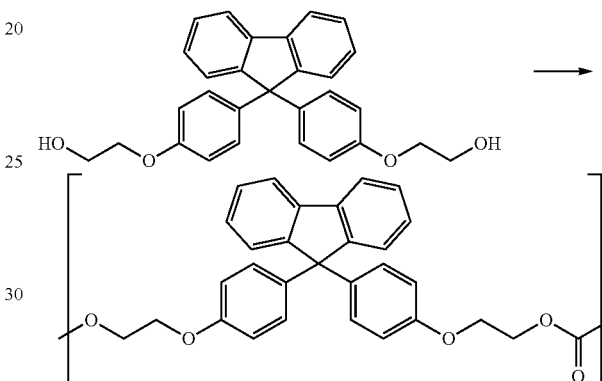

In the reaction vessel of the reaction system used in Example 1, purified chloroform (20 mL), 9,9-bis[4-(2-hydroxyethoxy)phenyl]fluorene (BPEF manufactured by Taoka Chemical) (2.19 g, 5 mmol) and 10 times by mole of pyridine (4.04 mL) to BPEF were added and mixed under stirring. Oxygen gas was blown into the stirred reaction mixture at a flow rate of 1 L/min at 20° C. to cause bubbling, and a light was irradiated from the low pressure mercury lamp for 2 hours.

Then, the power of the low pressure mercury lamp was turned off, and the mixture was stirred at 50° C. for 1 hour. Water and chloroform were added to the reaction mixture, and then the aqueous phase and the organic phase were separated. The organic phase was dried using anhydrous sodium sulfate and then concentrated. Methanol was added to the residue, and the re-precipitated component was obtained by filtration and dried at 50° C. for 2 hours under reduced pressure to obtain yellowish-white powder (yield amount: 1.01 g, yield: 43%). The obtained solid was analyzed by $^1$H NMR; as a result, it was confirmed that the target compound was produced.

The molecular weight of the obtained BPEF polycarbonate was measured by a similar condition to Example 1. The result is shown in Table 5.

TABLE 5

| Mw | Mn | Mw/Mn |
|---|---|---|
| 21,200 | 6,100 | 3.46 |

Example 6: Synthesis of BPEF Polycarbonate

In the reaction vessel of the reaction system used in Example 1, purified chloroform (40 mL), BPEF (2.19 g, 5 mmol) and sodium hydroxide aqueous solution (40 mL, 200 mmol) were added and mixed under stirring. Oxygen gas was blown into the stirred reaction mixture at a flow rate of 1 L/min at 0° C. to cause bubbling, and an operation to irradiate a light from the low pressure mercury lamp for 30 minutes and then stir the mixture without irradiating the light for 30 minutes was repeated 2 times totally for 2 hour in the reaction.

Then, sodium hydroxide aqueous solution (40 mL, 200 mmol) was further added, and the above-described operation of light irradiation —non-irradiation was repeated 2 times for 2 hour-reaction.

Dichloromethane was added to the reaction mixture, and then the aqueous phase and the organic phase were separated. The organic phase was dried using anhydrous sodium sulfate and then concentrated. Methanol was added to the residue, and the re-precipitated component was obtained by filtration and dried at atmospheric temperature for 2 hours under reduced pressure to obtain yellowish-white powder (yield amount: 1.06 g, yield: 46%). The obtained solid was analyzed by $^1$H NMR; as a result, it was confirmed that the target compound was produced.

The molecular weight of the obtained BPEF polycarbonate was measured by a similar condition to Example 1. The result is shown in Table 6.

TABLE 6

| Mw | Mn | Mw/Mn |
|---|---|---|
| 600 | 390 | 1.54 |

Example 7: Synthesis of PCPDM Polycarbonate

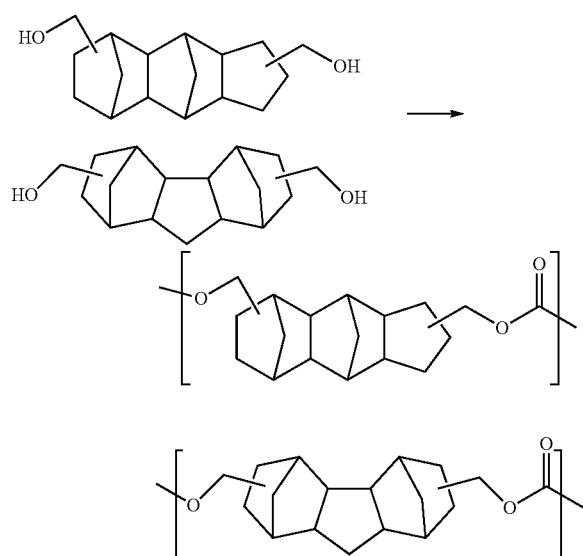

In the reaction vessel of the reaction system used in Example 1, purified chloroform (20 mL), pentacyclepentadecane dimethanol (PCPDM manufactured by MITSUBISHI GAS CHEMICAL) (2.62 g, 10 mmol) and 5 times by mole of pyridine (4.04 mL) to PCPDM were added and mixed under stirring. Oxygen gas was blown into the stirred reaction mixture at a flow rate of 1 L/min at 20° C. to cause bubbling, and a light was irradiated from the low pressure mercury lamp for 2 hours.

Then, pyridine (4.04 mL) was further added, and a light was irradiated from the low pressure mercury lamp for 2 hours while oxygen gas was blown into the mixture at a flow rate of 1 L/min at 20° C. to cause bubbling. Pyridine (8.08 mL) was further added, and a light was irradiated from the low pressure mercury lamp for 4 hours while oxygen gas was blown into the mixture at a flow rate of 1 L/min at 20° C. to cause bubbling.

The power of the low pressure mercury lamp was turned off, and the mixture was stirred at 50° C. for 1 hour. Water and chloroform were added to the reaction mixture, and then the aqueous phase and the organic phase were separated. The organic phase was dried using anhydrous sodium sulfate and then concentrated. Methanol was added to the residue, and the re-precipitated component was obtained by filtration and dried at 50° C. for 2 hours under reduced pressure to obtain brown powder (yield amount: 0.46 g, yield: 16%). The obtained solid was analyzed by $^1$H NMR; as a result, even though the raw material compound remained, it was confirmed that the target compound was produced.

The molecular weight of the obtained PCPDM polycarbonate was measured by a similar conditions to Example 1. The result is shown in Table 7.

TABLE 7

| Mw | Mn | Mw/Mn |
|---|---|---|
| 2,000 | 1,100 | 1.88 |

Example 8: Synthesis of PCPDM Polycarbonate

In the reaction vessel of the reaction system used in Example 1, purified chloroform (40 mL), PCPDM (2.62 g, 10 mmol) and sodium hydroxide aqueous solution (50 mL, 200 mmol) were added and mixed under stirring. Oxygen gas was blown into the stirred reaction mixture at a flow rate of 1 L/min at 20° C. to cause bubbling, and a light was irradiated from the low pressure mercury lamp for 2 hours.

Then, the power of the low pressure mercury lamp was turned off, and sodium hydroxide aqueous solution (50 mL, 200 mmol) was further added. The mixture was stirred at 20° C. for 7 hours with continuously blowing oxygen gas. The mixture was stirred for 15 minutes while a light was irradiated again from the low pressure mercury lamp and oxygen gas was blown into the mixture at a flow rate of 1 L/min at 20° C. to cause bubbling. Then, the power of the low pressure mercury lamp was turned off again, sodium hydroxide aqueous solution (25 mL, 100 mmol) was further added. The mixture was stirred for 12 hours and 45 minutes while oxygen gas was continuously blown.

Chloroform was added to the reaction mixture, and then the aqueous phase and the organic phase were separated. The organic phase was dried using anhydrous sodium sulfate and then concentrated. Methanol was added to the residue, and the re-precipitated component was obtained by filtration and dried at atmospheric temperature for 3 hours under reduced pressure to obtain white powder (yield amount: 2.03 g, yield: 70%). The obtained solid was analyzed by $^1$H NMR; as a result, it was confirmed that the target compound was produced.

The molecular weight of the obtained PCPDM polycarbonate was measured by a similar conditions to Example 1. The result is shown in Table 8.

TABLE 8

| Mw | Mn | Mw/Mn |
|---|---|---|
| 2,200 | 1,100 | 1.93 |

Example 9: Synthesis of ISB Polycarbonate

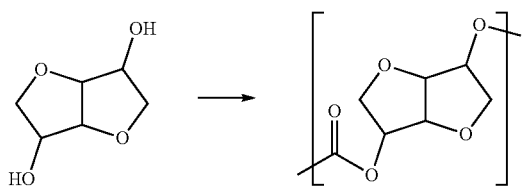

In the reaction vessel of the reaction system used in Example 1, purified chloroform (30 mL), isosorbide (ISB manufactured by Sanko Chemical Industry) (1.46 g, 10 mmol) and 5 times by mole of pyridine (4.0 mL) to isosorbide were added and mixed under stirring. Oxygen gas was blown into the stirred reaction mixture at a flow rate of 1 L/min at 0° C. to cause bubbling, and a light was irradiated from the low pressure mercury lamp for 6 hours.

Then, the power of the low pressure mercury lamp was turned off, and the mixture was stirred at 50° C. for 1 hour. The solvent was removed under reduced pressure, chloroform and methanol were added to the residue, and the precipitated component was obtained by filtration under reduced pressure and dried at 50° C. under reduced pressure for 1 hour to obtain pale yellow solid (yield amount: 1.82 g, yield: >99%). The obtained solid was analyzed by $^1$H NMR; as a result, it was confirmed that the target ISB polycarbonate was produced.

The molecular weight of the obtained ISB polycarbonate was measured by a similar conditions to Example 1. The result is shown in Table 9.

TABLE 9

| Mw | Mn | Mw/Mn |
|---|---|---|
| 4,193 | 1,569 | 2.673 |

Example 10: Synthesis of PTMG Polycarbonate

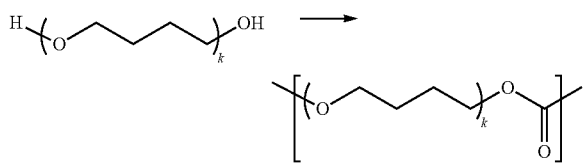

In the reaction vessel of the reaction system used in Example 1, purified chloroform (20 mL), poly(tetramethyleneether)glycol ("PolyTHF 2000S" manufactured by BASF, molecular weight: 2000 g/mol, the "k" in the above formula means repetition) (2.06 g, 1.03 mmol) and 50 times by mole of pyridine (4.04 mL) to poly(tetramethyleneether)glycol were added and mixed under stirring. Oxygen gas was blown into the stirred reaction mixture at a flow rate of 1 L/min at 20° C. to cause bubbling, and a light was irradiated from the low pressure mercury lamp for 3.5 hours.

The power of the low pressure mercury lamp was turned off, and the mixture was stirred at 40° C. for 1 hour. Water and chloroform were added to the reaction mixture, and then the aqueous phase and the organic phase were separated. The organic phase was dried using anhydrous sodium sulfate, concentrated under reduced pressure and then dried at 50° C. under reduced pressure for 2 hours to obtain brown oil (yield amount: 1.29 g, yield: 62%).

The obtained solid was analyzed by $^1$H NMR; as a result, it was confirmed that the target compound was produced.

The molecular weight of the obtained PTMG polycarbonate was measured by a similar condition to Example 1. The result is shown in Table 10.

TABLE 10

| Mw | Mn | Mw/Mn |
|---|---|---|
| 23,400 | 3,300 | 7.19 |

Example 11: Synthesis of Polycarbonate Copolymer

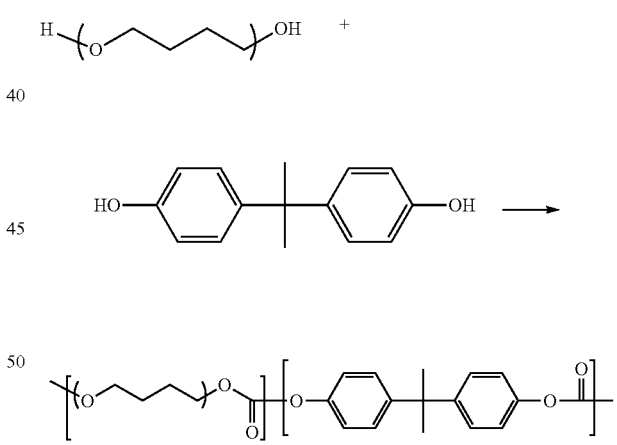

In the reaction vessel of the reaction system used in Example 1, purified chloroform (20 mL), Bisphenol A (BPA, manufactured by FUJIFILM Wako Pure Chemical Corporation) (0.46 g, 2.0 mmol), poly(tetramethylene ether)glycol ("PTMG 1500" manufactured by Mitsubishi Chemical Corporation, molecular weight: 1500 g/mol) (3.0 g, 2.0 mmol) and 5 times by mole of pyridine (1.6 mL) to a total amount of BPA and PTMG 1500 were added and mixed under stirring. Oxygen gas was blown into the stirred reaction mixture at a flow rate of 1 L/min at 50° C. to cause bubbling, and a light was irradiated from the low pressure mercury lamp for 2 hours.

Then, the power of the low pressure mercury lamp was turned off, and the mixture was stirred at 50° C. for 2 hours. Water and chloroform were added to the reaction mixture, and the organic phase and the aqueous phase were separated. The organic phase was dried using anhydrous sodium sulfate and then concentrated under reduced pressure. Chloroform and methanol was added to the residue, and the re-precipitated component was separated by decantation and dried at 50° C. for 2 hours under reduced pressure to obtain highly viscous brown oily purified product (yield amount: 3.33 g, yield: 99%). The obtained product was analyzed by gel permeation chromatography (GPC) in the following conditions to measure the molecular weight. The result is shown in Table 11.

Apparatus: high-speed liquid chromatograph system ("MD-2060", "PU-2089", "LC-NetII/ADC" and "CO-2060" manufactured by JASCO Corporation)
Column: "TSKgel G3000HR" (7.8 mm×300 mm) and "TSKgel G4000HR" (7.8 mm×300 mm, 2 columns in series) manufactured by Tosoh)
Moving phase: THF Flow rate: 0.5 mL/min
Oven temperature: 20° C. Concentration: 0.2 w/v %
Injection amount: 10 μL Standard of molecular weight: polystyrene
Detector: PDA

TABLE 11

| Mw | Mn | Mw/Mn |
|---|---|---|
| 55,575 | 9,923 | 5.6 |

It was expected that a homopolymer may be obtained as a main product, since the reactivities of an aromatic diol compound and an aliphatic diol compound are substantially different; on the one hand, it was surprising that a copolymer can be easily obtained as the above-described result.

Example 12: Synthesis of Polycarbonate Copolymer

In the reaction vessel of the reaction system used in Example 1, purified chloroform (20 mL), Bisphenol A (BPA) (0.46 g, 2.0 mmol), 9,9-bis[4-(2-hydroxyethoxy)phenyl]fluorene (BPEF) (0.88 g, 2.0 mmol) and 5 times by mole of pyridine (1.6 mL) to a total amount of BPA and BPEF were added and mixed under stirring. Oxygen gas was blown into the stirred reaction mixture at a flow rate of 1 L/min at 50° C. to cause bubbling, and a high energy light containing UV-C was irradiated from the low pressure mercury lamp for 2 hours.

Then, the power of the low pressure mercury lamp was turned off, and the mixture was stirred at 50° C. for 1 hour. Water and chloroform were added to the reaction mixture, and the organic phase and the aqueous phase were separated. The organic phase was dried using anhydrous sodium sulfate and then concentrated under reduced pressure. Chloroform and methanol was added to the residue, and the re-precipitated component was separated by decantation and dried at 50° C. for 2 hours under reduced pressure to obtain beige solid. The obtained product was analyzed by $^1$H NMR; as a result, it was confirmed that the target BPA-BPEF polycarbonate copolymer was produced (yield amount: 1.13 g, yield: 65%). The experimental result shows that a copolymer can be successfully obtained by using 2 or more kinds of diol compounds in the present invention method. The obtained product was analyzed by gel permeation chromatography (GPC) in the same conditions as Example 11 to measure the molecular weight. The result is shown in Table 12.

TABLE 12

| Mw | Mn | Mw/Mn |
|---|---|---|
| 28,562 | 5,616 | 5.09 |

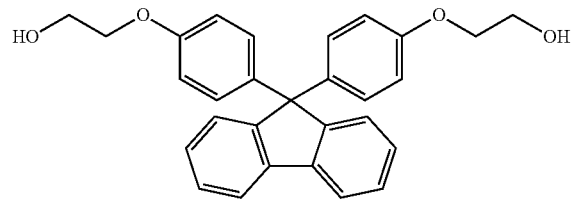
+
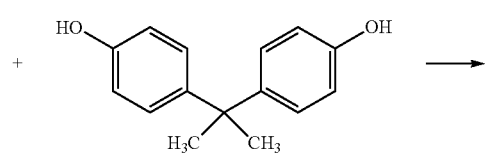

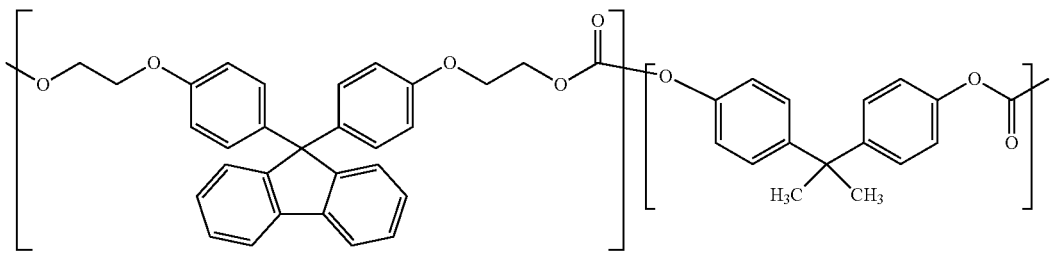

Example 13: Synthesis of Polycarbonate Copolymer

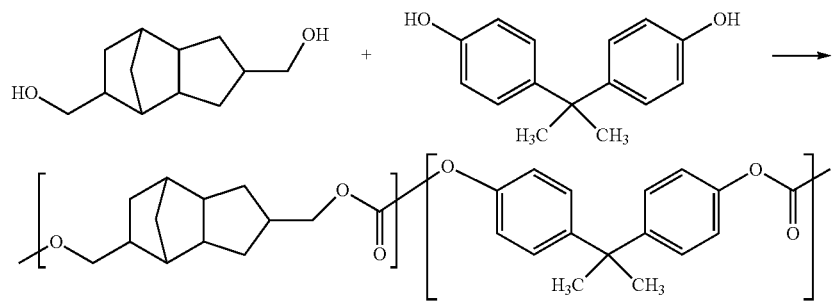

In the reaction vessel of the reaction system used in Example 1, purified chloroform (20 mL), Bisphenol A (BPA) (0.46 g, 2.0 mmol), tricyclo[5.2.1.0(2,6)]decanedimethanol (TCDDM) (0.39 g, 2.0 mmol) and 5 times by mole of pyridine (1.6 mL) to a total amount of BPA and TCDDM were added and mixed under stirring. Oxygen gas was blown into the stirred reaction mixture at a flow rate of 1 L/min at 50° C. to cause bubbling, and a high energy light containing UV-C was irradiated from the low pressure mercury lamp for 2 hours.

Then, the power of the low pressure mercury lamp was turned off, and the mixture was stirred at 50° C. for 1 hour. Methanol was added to the reaction mixture, and the precipitated component was separated by decantation and dried at 50° C. for 2 hours under reduced pressure to obtain white solid. The obtained product was analyzed by $^1$H NMR; as a result, it was confirmed that the target BPA-TCDDM polycarbonate copolymer was produced (yield amount: 1.11 g, yield: 89%). The experimental result shows that a copolymer can be successfully obtained by using 2 or more kinds of diol compounds in the present invention method. The obtained product was analyzed by gel permeation chromatography (GPC) in the same conditions as Example 11 to measure the molecular weight. The result is shown in Table 13.

TABLE 13

| Mw | Mn | Mw/Mn |
|---|---|---|
| 25,297 | 10,431 | 2.43 |

Example 14: Synthesis of Polycarbonate Copolymer

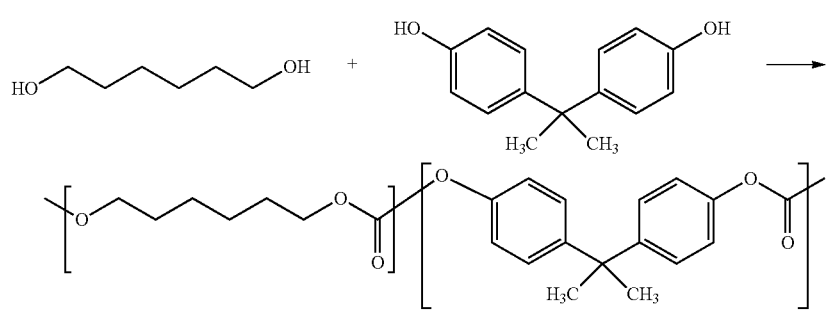

In the reaction vessel of the reaction system used in Example 1, purified chloroform (20 mL), Bisphenol A (BPA) (0.46 g, 2.0 mmol), 1,6-hexanediol manufactured by Tokyo Chemical Industry (0.24 g, 2.0 mmol) and 5 times by mole of pyridine (1.6 mL) to the diols were added and mixed under stirring. Oxygen gas was blown into the stirred reaction mixture at a flow rate of 1 L/min at 50° C. to cause bubbling, and a high energy light containing UV-C was irradiated from the low pressure mercury lamp for 2 hours.

Then, the power of the low pressure mercury lamp was turned off, and the mixture was stirred at 50° C. for 1 hour. Dichloromethane and methanol were added to the reaction mixture, and the precipitated component was separated by decantation and dried at 100° C. for 1 hour under reduced pressure to obtain yellowish white solid. The obtained product was analyzed by $^1$H NMR; as a result, it was confirmed that the target Bisphenol A-hexanediol polycarbonate copolymer was produced (yield amount: 0.42 g, yield: 52%). The experimental result shows that a copolymer can be successfully obtained by using 2 or more kinds of diol compounds in the present invention method. The obtained product was analyzed by gel permeation chromatography (GPC) in the same conditions as Example 11 to measure the molecular weight. The result is shown in Table 14.

TABLE 14

| Mw | Mn | Mw/Mn |
|---|---|---|
| 17,825 | 8,290 | 2.15 |

Example 15: Synthesis of Polycarbonate Copolymer

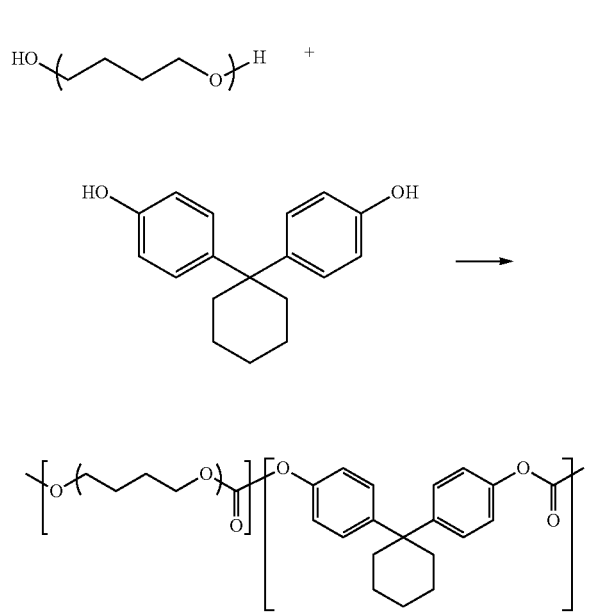

In the reaction vessel of the reaction system used in Example 1, purified chloroform (20 mL), poly(tetramethylene ether)glycol (PTMG 1500, 3.0 g, 2.0 mmol), Bisphenol Z [1,1-bis(4-hydroxyphenyl)cyclohexane, manufactured by Tokyo Chemical Industry](0.54 g, 2.0 mmol) and 5 times by mole of pyridine (1.6 mL) to the total amount of the diols were added and mixed under stirring. Oxygen gas was blown into the stirred reaction mixture at a flow rate of 1 L/min at 50° C. to cause bubbling, and a high energy light containing UV-C was irradiated from the low pressure mercury lamp for 2 hours.

Then, the power of the low pressure mercury lamp was turned off, and the mixture was stirred at 50° C. for 1 hour. Water and chloroform were added to the reaction mixture, and the organic phase and the aqueous phase were separated. The organic phase was dried using anhydrous sodium sulfate and then concentrated, and the obtained residue was dried at 100° C. for 1 hour under reduced pressure to obtain highly viscous light brown oily product. The obtained product was analyzed by $^1$H NMR; as a result, it was confirmed that the target PTMG 1500-Bisphenol Z polycarbonate copolymer was produced (yield amount: 2.4 g, yield: 66%). The experimental result shows that a copolymer can be successfully obtained by using 2 or more kinds of diol compounds in the present invention method. The obtained product was analyzed by gel permeation chromatography (GPC) in the same conditions as Example 11 to measure the molecular weight. The result is shown in Table 15.

TABLE 15

| Mw | Mn | Mw/Mn |
|---|---|---|
| 46,539 | 20,634 | 2.35 |

Example 16: Synthesis of Polycarbonate Copolymer

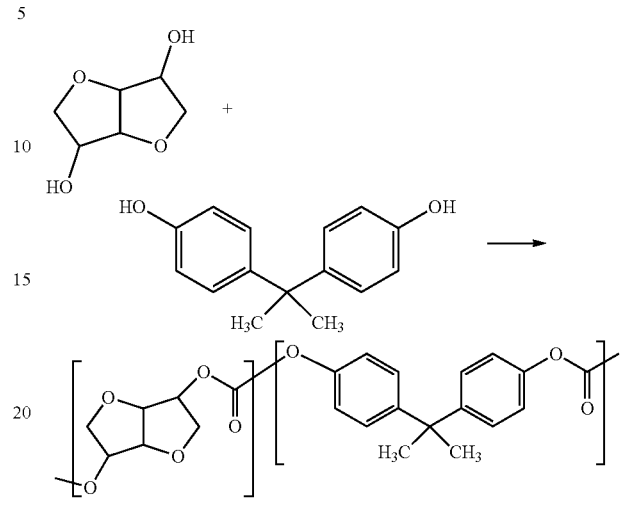

In the reaction vessel of the reaction system used in Example 1, purified chloroform (30 mL), Bisphenol A (BPA) (1.14 g, 5.0 mmol), isosorbide (ISB) (0.73 g, 5.0 mmol) and 2.5 times by mole of pyridine (2 mL) to BPA and ISB were added and mixed under stirring. Oxygen gas was blown into the stirred reaction mixture at a flow rate of 1 L/min at 50° C. to cause bubbling, and a high energy light containing UV-C was irradiated from the low pressure mercury lamp for 1.5 hours.

Then, the power of the low pressure mercury lamp was turned off, and the mixture was stirred at 50° C. for 1 hour. The solvent was distilled away under reduced pressure. Chloroform and methanol were added to the residue, and the precipitated component was obtained by suction filtration and dried at 50° C. for 2 hours under reduced pressure to obtain pale beige solid (yield amount: 2.01 g, yield: >99%). The obtained product was analyzed by $^1$H NMR; as a result, it was confirmed that the target BPA-IBS polycarbonate copolymer was produced.

The molecular weight of the obtained ISB polycarbonate was measured in the same conditions as Example 11. The result is shown in Table 16.

TABLE 16

| Mw | Mn | Mw/Mn |
|---|---|---|
| 7,935 | 3,680 | 2.156 |

EXPLANATION OF REFERENCES

1: Light-irradiating means, 2: Jacket, 3: Water bath, 4: Stirring bar, 5: Heating medium or Cooling medium, 6: Cylindrical reaction vessel

The invention claimed is:
1. A method for producing a polycarbonate,
the method comprising the step of irradiating a light to a composition comprising a $C_{1-4}$ halogenated hydrocarbon, a diol compound and a base in the presence of oxygen, wherein the base is pyridine, picoline or lutidine, and wherein the diol compound is any one of the compounds represented by the following formulae (I¹) to (I⁶):

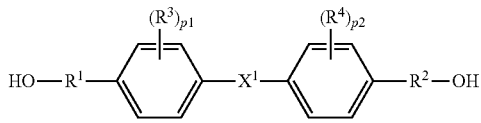
(I¹)

wherein
R¹ and R² are independently —$(CR^5R^6)_{q1}$— or —(—O—$(CR^5R^6)_{q2}$—$)_{q3}$— wherein $R^5$ and $R^6$ are independently H or a $C_{1-6}$ alkyl group, q1 is an integer of 0 or more and 10 or less, q2 is an integer of 1 or more and 10 or less, q3 is an integer of 1 or more and 10 or less, and when q1 or q2 is an integer of 2 or more, a plurality of $R^5$ or $R^6$ may be the same as or different from each other,
$R^3$ and $R^4$ are independently one or more halogeno groups selected from the group consisting of chloro, bromo and iodo, a $C_{1-20}$ aliphatic hydrocarbon group, a $C_{1-20}$ alkoxy group, a $C_{3-20}$ cycloalkyl group, a $C_{6-20}$ aromatic hydrocarbon group, a $C_{7-20}$ aralkyl group, a $C_{6-20}$ aromatic hydrocarbon oxy group or a $C_{3-20}$ cycloalkoxy group,
$X^1$ is the following group:

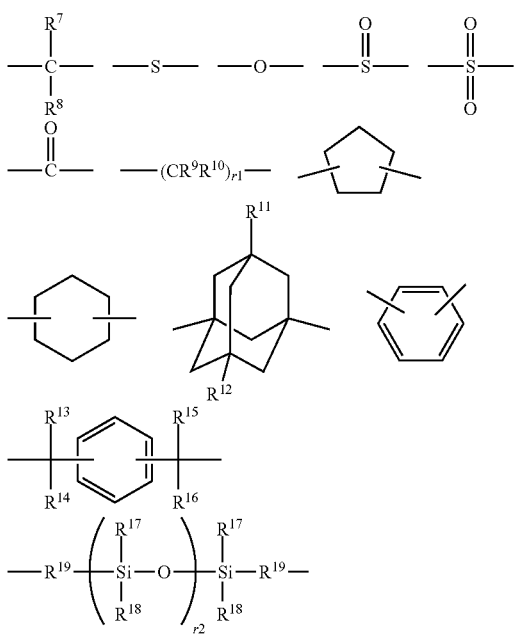

wherein
$R^7$ and $R^8$ are independently H, one or more halogeno groups selected from the group consisting of chloro, bromo and iodo, a $C_{1-20}$ aliphatic hydrocarbon group optionally having a substituent a, a $C_{1-20}$ alkoxy group optionally having a substituent α, a $C_{6-20}$ aromatic hydrocarbon group optionally having a substituent β, or $R^7$ and $R^8$ may bind together to form a $C_{3-20}$ carbon ring or a 5-12 membered hetero ring,
$R^9$ and $R^{10}$ are independently H or a $C_{1-6}$ alkyl group, and when r1 is an integer of 2 or more, a plurality of $R^9$ or $R^{10}$ may be the same as or different from each other, $R^{11}$ to $R^{18}$ are independently one or more halogeno groups selected from the group consisting of chloro, bromo and iodo, a $C_{1-20}$ aliphatic hydrocarbon group optionally having a substituent α, a $C_{1-20}$ alkoxy group optionally having a substituent α, or a $C_{6-12}$ aromatic hydrocarbon group optionally having a substituent β,
$R^{19}$ is a $C_{1-9}$ alkylene group optionally having a substituent α,
r1 is an integer of 1 or more and 20 or less,
r2 is an integer of 1 or more and 500 or less,
p1 and p2 are independently integers of 0 or more and 4 or less,
substituent α is one or more substituents selected from the group consisting of a $C_{1-6}$ alkoxy group, a $C_{1-7}$ acyl group, one or more kinds of halogeno groups selected from the group consisting of chloro, bromo and iodo, an amino group, a nitro group, a cyano group and a carbamoyl group,
substituent β is one or more substituents selected from the group consisting of a $C_{1-6}$ alkyl group, a $C_{1-6}$ alkoxy group, a $C_{1-7}$ acyl group, one or more kinds of halogeno groups selected from the group consisting of chloro, bromo and iodo, an amino group, a nitro group, a cyano group and a carbamoyl group,

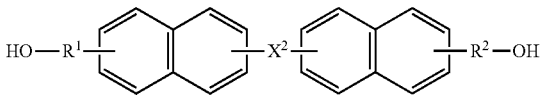
(I²)

wherein $R^1$ and $R^2$ have the same meanings as the above, and $X^2$ has the same meaning as $X^1$,

HO—R¹—X³—R²—OH (I³)

wherein $R^1$ and $R^2$ have the same meanings as the above, and $X^3$ is a $C_{15-32}$ divalent aromatic hydrocarbon group,

HO—R²⁰—X⁴—R²¹—OH (I⁴)

wherein $R^{20}$ and $R^{21}$ are independently —$(CR^5R^6)_{m1}$— or —(—O—$(CR^5R^6)_{m2}$—$)_{m3}$—, wherein $R^5$ and $R^6$ have the same meanings as the above, m1 is an integer of 1 or more and 10 or less, m2 is an integer of 1 or more and 10 or less, m3 is an integer of 1 or more and 10 or less, and when m1 or m2 is an integer of 2 or more, a plurality of $R^5$ or Re may be the same as or different from each other, and $X^4$ is a divalent group comprising one or more hydrocarbon rings or hetero ring,

HO—R¹—X⁵—R²—OH (I⁵)

wherein $R^1$ and $R^2$ have the same meanings as the above, and $X^5$ is a divalent saturated heterocycle group,

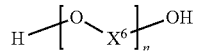
(I⁶)

wherein $X^6$ is a $C_{1-10}$ alkylene group, and n is an integer of 13 or more and 50 or less.

2. The method according to claim 1, wherein the $C_{1-4}$ halogenated hydrocarbon is a $C_{1-4}$ polyhalogenated hydrocarbon.

3. The method according to claim 1, wherein the $C_{1-4}$ halogenated hydrocarbon is chloroform.

4. The method according to claim 1, wherein a content of the diol compound to the $C_{1-4}$ halogenated hydrocarbon is 0.001 times or more by mole and 1 time or less by mole.

5. The method according to claim 1, wherein a content of the base to the diol compound is 1.5 times or more by mole and 100 times or less by mole.

6. The method according to claim 1, wherein the light irradiated to the composition comprises a light having a wavelength of 180 nm or more and 280 nm or less.

7. The method according to claim 1, wherein the composition comprises two or more different diol compounds.

* * * * *